(12) United States Patent
Inoue

(10) Patent No.: US 9,444,933 B2
(45) Date of Patent: Sep. 13, 2016

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Yutaka Inoue, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 189 days.

(21) Appl. No.: 14/298,266

(22) Filed: Jun. 6, 2014

(65) Prior Publication Data

US 2014/0376411 A1     Dec. 25, 2014

(30) Foreign Application Priority Data

Jun. 19, 2013 (JP) ................................. 2013-129027

(51) Int. Cl.
   *H04M 3/428* (2006.01)
   *H04N 1/00* (2006.01)
   *H04N 1/327* (2006.01)

(52) U.S. Cl.
   CPC ......... *H04M 3/4288* (2013.01); *H04N 1/0022* (2013.01); *H04N 1/32708* (2013.01); *H04N 1/32719* (2013.01); *H04N 1/32723* (2013.01); *H04N 1/32745* (2013.01); *H04N 1/32754* (2013.01); *H04M 2201/52* (2013.01)

(58) Field of Classification Search
   None
   See application file for complete search history.

(56) References Cited

U.S. PATENT DOCUMENTS

| | | | | |
|---|---|---|---|---|
| 3,997,727 A | * | 12/1976 | Platts | G05B 19/05 370/366 |
| 4,080,517 A | * | 3/1978 | Moricca | H04M 9/003 379/164 |
| 4,088,846 A | * | 5/1978 | McEowen | H04M 9/002 379/156 |
| 5,292,125 A | * | 3/1994 | Hochstein | A63F 13/12 463/41 |
| 5,539,814 A | * | 7/1996 | Shoji | H04M 3/428 379/215.01 |
| 5,717,493 A | * | 2/1998 | Ozawa | H04N 1/32782 358/400 |

(Continued)

FOREIGN PATENT DOCUMENTS

JP     2006-295559 A     10/2006

*Primary Examiner* — Bunjob Jaroenchonwanit
(74) *Attorney, Agent, or Firm* — Rossi, Kimms & McDowell LLP

(57) ABSTRACT

There are provided a communication apparatus capable of performing voice communication via an IP network, and performing FAX communication using a deemed voice, and a method of controlling the same. At the time of reception of an incoming call, the apparatus determines whether an incoming voice communication call or digital data has been received. If it is determined that the incoming voice communication call has been received and there is an already connected voice communication section, the SLIC superimposes a tone of a notification of the incoming call during voice communication on a voice during voice communication. When the telephone instructs to switch to the incoming call, the apparatus establishes a new session for the incoming call, and controls the selector to connect the already connected voice communication session to the digital modem to send a holding tone.

11 Claims, 14 Drawing Sheets

(56) References Cited

U.S. PATENT DOCUMENTS

| | | | | |
|---|---|---|---|---|
| RE36,574 E * | 2/2000 | Hochstein | ............... | A63F 13/12 273/148 B |
| 6,640,094 B1 * | 10/2003 | Tabeta | ................. | H04J 3/0688 370/474 |
| 6,704,400 B1 * | 3/2004 | Liang | .................... | H04M 11/06 379/93.35 |
| 6,728,534 B1 * | 4/2004 | Izumi | .................... | H04M 1/725 379/100.01 |
| 6,819,747 B2 * | 11/2004 | Nassimi | ............... | H04M 11/062 379/93.09 |
| 6,915,421 B1 * | 7/2005 | Kalmanek Jr. | .......... | H04L 29/06 370/410 |
| 7,102,620 B2 * | 9/2006 | Harries | ................ | G06F 1/1616 345/156 |
| 7,711,104 B1 * | 5/2010 | Flockhart | ............ | H04M 3/5191 379/265.03 |
| 7,787,896 B2 * | 8/2010 | Kundu | .................... | H04W 4/10 455/414.1 |
| 8,174,718 B2 * | 5/2012 | Higuchi | ............... | H04M 11/066 358/1.15 |
| 2001/0053001 A1 * | 12/2001 | Numata | ............. | H04N 1/00281 358/468 |
| 2002/0072395 A1 * | 6/2002 | Miramontes | ........ | H04M 1/0214 455/566 |
| 2003/0086541 A1 * | 5/2003 | Brown | ................ | H04M 3/4228 379/88.01 |
| 2003/0216146 A1 * | 11/2003 | Otsuka | ............. | H04M 1/72502 455/462 |
| 2004/0119685 A1 * | 6/2004 | Harries | ................ | G06F 1/1616 345/156 |
| 2004/0198435 A1 * | 10/2004 | Gauld | ................ | H04M 1/0214 455/556.1 |
| 2004/0229663 A1 * | 11/2004 | Tosey | ................... | G06F 1/1622 455/575.1 |
| 2005/0111639 A1 * | 5/2005 | Chida | ................... | H04N 1/327 379/100.01 |
| 2005/0148354 A1 * | 7/2005 | Kim | ................... | H04M 19/041 455/466 |
| 2005/0286496 A1 * | 12/2005 | Malhotra | .......... | H04L 29/06027 370/352 |
| 2007/0025338 A1 * | 2/2007 | Benditovich | ..... | H04L 29/06027 370/352 |
| 2008/0019492 A1 * | 1/2008 | Jyoti | ....................... | H04L 12/66 379/100.01 |
| 2008/0316543 A1 * | 12/2008 | Higuchi | ............... | H04M 11/066 358/443 |
| 2012/0110403 A1 * | 5/2012 | Chen | .................... | H04L 1/1809 714/748 |
| 2012/0262761 A1 * | 10/2012 | Ulybin | .............. | H04N 1/32789 358/407 |
| 2012/0268797 A1 * | 10/2012 | Inoue | ................. | H04N 1/33323 358/442 |
| 2013/0003132 A1 * | 1/2013 | Ashmore | .......... | H04N 1/32765 358/442 |
| 2013/0057925 A1 * | 3/2013 | Shmunis | ........... | H04N 1/32422 358/402 |
| 2013/0174059 A1 * | 7/2013 | Van Wie | ........... | G06F 3/04815 715/757 |
| 2013/0303133 A1 * | 11/2013 | Sansalone | ........ | H04M 1/72519 455/414.1 |
| 2014/0376411 A1 * | 12/2014 | Inoue | ................. | H04M 3/4288 370/259 |
| 2015/0036485 A1 * | 2/2015 | Poulson | ............. | H04L 41/0668 370/228 |
| 2015/0071087 A1 * | 3/2015 | Nortz | ............... | H04L 29/12377 370/250 |
| 2015/0304498 A1 * | 10/2015 | McCord et al. | ........ | H04L 45/44 379/265.09 |

* cited by examiner

F I G. 14A

```
INVITE sip:bob@example.com SIP/2.0
Via: SIP/2 0/UDP pc33.ganon.co.jp branch=z9hG4bKnashds8
Max-Forwards: 70
To: Bob <sip:bob@example.com>
From: Alice <sip:alice@ganon.co.jp>;tag=1928301774
Call-ID: a81b4c76e66710@pc33.ganon.co.jp
CSeq: 314159 1NVITE
Contact:<sip:alice@pc33.ganon.co.jp>
Conten-Typei application/sdp
Content-Lenth: 153 v=0
o=alice 53655765 2353687637 1N IP4 pc33.ganon.co.jp
s=-
t=0 0
m=audio 5004 RTP/AVP 0
a=rtpmap:8 PCMU/8000
```

F I G. 14B

```
INVITE sip:bob@example.com SIP/2.0
Via: SIP/2 0/UDP pc33.ganon.co.jp branch=z9hG4bKnashds8
Max-Forwards: 70
To: Bob <sip:bob@example.com>
From: Alice <sip:alice@ganon.co.jp>;tag=1928301774
Call-ID: a81b4c76e66710@pc33.ganon.co.jp
CSeq: 314159 1NVITE
Contact:<sip:alice@pc33.ganon.co.jp>
Conten-Typei application/sdp
Content-Lenth: 153 v=0
o=alice 53655765 2353687637 1N IP4 pc33.ganon.co.jp
s=-
t=0 0
m=application 30000 TCP t38
```

COMMUNICATION APPARATUS, METHOD OF CONTROLLING THE SAME, AND STORAGE MEDIUM

BACKGROUND OF THE INVENTION

1. Field of the Invention

The present invention relates to a communication apparatus, a method of controlling the same, and a storage medium.

2. Description of the Related Art

In addition to facsimile (to be referred to as FAX hereinafter) communication using a conventional public switched telephone network (PSTN), there is provided FAX communication using a high-speed network such as an IP network. There are two methods for FAX communication using the IP network. One of the methods is to implement, by using a deemed voice, T.30 FAX using the T.30 protocol of ITU-T recommendation. This method is a method of performing communication by converting a T.30 analog signal into a digital signal, and is called T.30 FAX deemed voice communication since communication is performed by deeming a T.30 analog signal a voice signal.

The other method is a communication method called T.38 of ITU-T recommendation, which performs communication without converting a digital signal communicated according to the T.30 protocol. This method can implement higher-speed communication, as compared with T.30. The above-described two methods implement Point-to-Point communication on the IP network using SIP (Session Initiation Protocol) as a call control unit.

Examples of the IP network are a digital public network called an NGN (Next Generation Network) provided by NTT Group in Japan, and a private IP line using an IP private branch exchange (IP-PBX) or the like. In the case of the NGN network, for example, the bandwidth is guaranteed and the security is managed, thereby allowing high-speed secure image communication. Although the communication speed of the conventional PSTN is at most 33.6 Kbps, the NGN guarantees a communication speed of at most 1 Mbps, thereby allowing communication at a speed about 30 times higher than that of the PSTN.

There is provided a method in which an image communication apparatus capable of performing T.38 FAX communication and T.30 FAX deemed voice communication implements an operation of a telephone system on the IP network. In this case, it is possible to perform voice communication and FAX communication by only connecting to the network without connecting to the public switched telephone network (PSTN). To do this, similarly to FAX communication, a handset and a slave are connected to the IP network, and exchanges voice data by transmitting voice packets via the IP network. This is a so-called IP phone, for which ITU-T recommendation G.711 is used as a voice packet encoding method and RTP (Real Time Protocol) is used as a transmission protocol.

To implement a telephone by connecting to the IP network, an SLIC (Subscriber Line Interface Circuit) for connecting the telephone to the IP network is used. The main application purpose of this SLIC is identification of a dial signal from the telephone and the like, ringing control of the telephone, detection of a hooking operation of the telephone, and the like.

To simultaneously connect to a plurality of connection destinations by the PSTN, it is necessary to connect modular cables, the number of which is equal to that of connection destinations. In T.30 FAX deemed voice communication using an IP line, however, it is possible to simultaneously connect to a plurality of connection destinations to perform communications and voice communications by only connecting one network cable. This is called a multi-session connection. In the multi-session environment, with respect to SIP, a connection session starts with an SIP session connection request signal INVITE, and ends with an SIP session disconnection signal BYE. The first connection is the first session, and the next connection is the second session. These connections are not linked with physical lines. By complying with this kind of multi-session connection, it is possible to simultaneously perform a plurality of communications and a plurality of voice communications.

The above-described NGN provides a "multi-channel (the service name in the NGN)" service as a multi-session service. By subscribing to this service, it becomes possible to perform simultaneous communication or voice communication of at most two sessions with one telephone number. The above-described image communication apparatus can be compatible with the multi-session connection. For a conventional image communication apparatus which is compatible with multiple public lines, only one specific line is used for voice communication, and other lines are dedicated to FAX communication. That is, only one telephone can be attached to the image communication apparatus. The main purpose of this is to suppress an increase in cost.

For the same reason, even in the multi-session environment of the IP network, only one telephone can be connected to the image communication apparatus, and it is impossible to simultaneously perform voice communications using two sessions. Such an image communication apparatus can perform two types of communications, that is, (FAX communication+voice communication) and (FAX communication+FAX communication) by simultaneously using two channels. However, this restriction is imposed on only the image communication apparatus, and a plurality of incoming audio calls may be received from the IP network. As will be described later, T.30 FAX deemed voice communication is an incoming audio call. Therefore, only after receiving the incoming call, it can be determined whether the incoming call is voice communication or FAX communication. Therefore, the image communication apparatus which supports only one telephone needs to appropriately control an incoming audio call. For example, assume that when an incoming audio call is received during voice communication with a telephone, the apparatus transits to FAX communication since it can perform only FAX communication. In this case, if the purpose of the incoming call is voice communication, the voice communication cannot be performed, and the incoming call is in vain.

There is also provided a "call waiting (the service name in the NGN)" service as a carrier service. The call waiting service is a service of notifying, when another incoming call is received during voice communication, the user of the incoming call, switching to a communication partner who has called later, and returning to the voice communication with the previous caller. The call waiting service is effective even in the multi-session connection. Even while two sessions are simultaneously used, an incoming call notification is sent from the network during voice communication by using the call waiting service, and it is thus necessary to notify the user of the incoming call. As described above, since only one telephone is connected to the image communication apparatus, it is impossible to notify the user of an incoming call by causing the telephone to ring without any change.

Furthermore, an image communication apparatus which supports voice communication has various reception modes such as an automatic reception mode, FAX/TEL switching mode, and manual reception mode. The automatic reception mode is a mode in which, upon reception of an incoming call, the apparatus automatically transits to FAX reception without causing a connected telephone to respond. The FAX/TEL switching mode is a mode in which the apparatus automatically determines whether an incoming voice communication is FAX communication or telephone communication. In this mode, if a FAX initial identification signal (Calling: CNG signal) is detected after the FAX side establishes a call connection, FAX reception automatically starts. Alternatively, if no CNG signal is detected, the telephone is caused to ring so as to call for the user. The manual reception mode is a mode in which only voice communication is supported. In this mode, the apparatus is not automatically switched to FAX reception, unlike the FAX/TEL switching mode. In this case, however, if the user issues a manual incoming call instruction, or the apparatus has a remote reception function, the apparatus is switched to FAX reception according to the instruction. The remote reception function is a function of switching the main body to FAX reception by an operation (a predetermined dial) of the connected telephone.

A case will be described in which an image communication apparatus having a telephone function and a function of performing FAX communication (T.38 FAX communication and T.30 FAX deemed voice communication) via the IP network by connecting to the IP network receives a call in the above-described reception mode. It is possible to discriminate between an incoming T.38 call and an incoming T.30 FAX deemed voice call or incoming voice communication call by a media attribute sent by a partner apparatus used according to an SIP procedure. The user is notified of an incoming call by an INVITE signal according to the SIP procedure. The contents of the notification include a media attribute (m=the following description included in the INVITE signal). If m=audio, it indicates an incoming T.30 FAX deemed voice call or incoming voice communication call. If m=image or m=application, it indicates an incoming call of T.38 FAX communication. Therefore, upon receiving an incoming T.38 call, the apparatus can automatically transit to T.38 FAX reception from any reception mode. However, the media attribute of an incoming T.30 FAX deemed voice call is the same as that of voice communication, and thus these calls cannot be discriminated. To switch the apparatus to FAX reception in the FAX/TEL switching mode, therefore, it is necessary to determine whether the call is FAX communication after it is connected.

Furthermore, when multi-session connection is supported, two sessions may be used for voice communications instead of FAX communications. In this case, the "call waiting" service provided by the carrier is effective. Since, however, only one telephone is attached to the image communication apparatus, it is necessary to appropriately distribute the voice communications. This distribution technique is described in Japanese Patent Laid-Open No. 2006-295559. The patent literature describes a technique in which if a call in progress is FAX communication, a new incoming call is rejected, and if a call in progress is voice communication, a new incoming call is received. However, the patent literature does not describe multi-session support or an audio session operation in each reception mode.

As described above, even in the case of an image communication apparatus compatible with the multi-session connection, only one telephone is connected at all time and an SLIC for telephone control is provided for only one session. Therefore, in this arrangement, the telephone cannot receive an incoming audio voice communication of the second session while the first session uses the SLIC (telephone function) or an incoming audio call (an incoming call with call waiting) using the call waiting service while the two sessions are fully used. Also, it is impossible to notify the caller of an incoming interrupt call upon receiving an incoming audio call. Furthermore, assume that when an incoming call with call waiting is received while the two sessions are fully used, the partner apparatus is an FAX. In this case, if the image communication apparatus transits to FAX reception, the previous voice communication partner enters a holding state to wait a long time during FAX reception. In addition, the voice communication partner needs to bear an unnecessary communication cost while the voice communication is on hold.

SUMMARY OF THE INVENTION

An aspect of the present invention is to eliminate the above-mentioned problems which are found in the conventional technology.

A feature of the present invention is to provide a technique in which when an image communication apparatus compatible with the multi-session connection receives an incoming audio call during voice communication with the first session, the apparatus can switch to voice communication or FAX communication.

According to an aspect of the present invention, there is provided a communication apparatus capable of performing voice communication via an IP network, and performing FAX communication using a deemed voice, comprising: a telephone control unit configured to connect a telephone and control the telephone; a FAX communication control unit configured to control FAX communication using a deemed voice; a selection unit configured to switch a signal from the IP network to the telephone control unit and the FAX communication control unit; a determination unit configured to determine, at the time of reception of an incoming call, whether an incoming voice communication call or digital data has been received; and a control unit configured to, if the determination unit determines that the incoming voice communication call has been received and there is an already connected voice communication session, control the telephone control unit to superimpose a tone of a notification of the incoming call during voice communication on a voice during voice communication and to establish a new session for the incoming call when the telephone instructs to switch to the incoming call, control the selection unit to connect the already connected voice communication session to the FAX communication control unit, and control the FAX communication control unit to send a holding tone.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 14A and 14B depict views each showing an example of an INVITE signal of SIP.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

An image communication apparatus according to an embodiment can perform facsimile transmission using a T.30 FAX deemed voice of ITU-T recommendation T.30 and perform voice communication using voice packets via a high-speed network such as an IP network. In this embodiment, control of switching between voice communication and facsimile transmission using a T.30 FAX deemed voice by a plurality of sessions will be explained.

Figure 1:
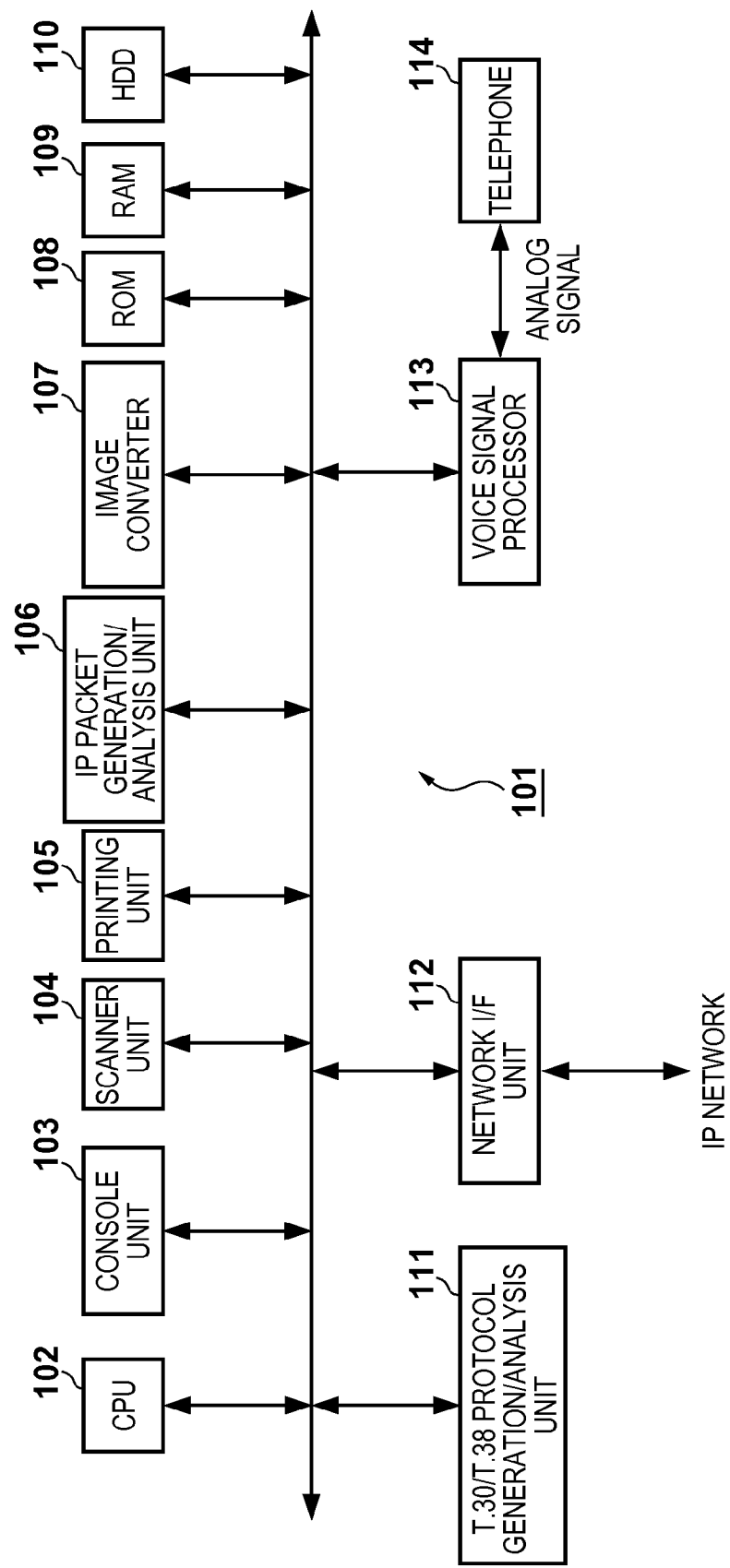
FIG. 1 is a block diagram showing the schematic arrangement of an image communication apparatus according to an embodiment.

FIG. 1 is a block diagram showing the schematic arrangement of an image communication apparatus 101 according to the embodiment.

A CPU 102 controls the operation of each unit of the image communication apparatus 101 according to a control program stored in a ROM 108. A console unit 103 includes a display unit having a touch panel function, and key console unit with hard keys and the like. A display screen displays, for example, windows, icons, messages, menus, and other user interface information. Although not shown, the console unit 103 includes various keys used by the user to perform copy, FAX, and print operations, and a pointing device used to operate the icons, menus, and the like on the display screen. A scanner unit 104 reads a document. A printing unit 105 executes printing based on print data saved in a RAM 109 or an HDD (Hard Disk Drive) 110. The ROM 108 holds various control programs, data, and the like. The RAM 109 includes a work area for the CPU 102, an area for saving data at the time of error processing, and an area for loading the control programs. The HDD 110 is used to save various control programs and print data. A T.30/T.38 protocol generation/analysis unit 111 has a function of generating facsimile transmission information by an ITU-T recommendation T.30/T.38 protocol, and reading out the facsimile transmission information of the received protocol. An IP packet generation/analysis unit 106 has a function of mapping the ITU-T recommendation T.30/T.38 protocol to an IP packet, and reading out the ITU-T recommendation T.30/T.38 protocol from the received IP packet. An image converter 107 performs compression/decompression, scaling, and linear density conversion for image data to undergo FAX communication. A network interface unit 112 is a network unit I/F unit called a NIC (Network Interface Controller) through which the apparatus is connected to the IP network. A voice signal processor 113 processes T.30 FAX deemed voice communication and a voice signal for voice communication. A telephone 114 is connected to an SLIC 208 (FIG. 2) of the voice signal processor 113.

Voice communication processing and communication using a T.30 FAX deemed voice will be briefly explained.

Signals used for voice communication and T.30 FAX deemed voice communication are obtained by packetizing voice data encoded by an encoding method called G.711 (PCM). The network I/F unit 112 receives the packetized voice data via the IP network, and the IP packet generation/analysis unit 106 analyzes the received data to extract pure voice encoded data and transfer the data to the voice signal processor 113. The IP packet generation/analysis unit 106 also has a function of distributing the voice data for two sessions so as to support the multi-session connection. That is, the IP packet generation/analysis unit 106 divides the voice data for the two sessions, and transfers them to the voice signal processor 113. The voice data from the voice signal processor 113 are packetized for each session by the IP packet generation/analysis unit 106, and sent to the IP network via the network I/F unit 112.

Figure 2:
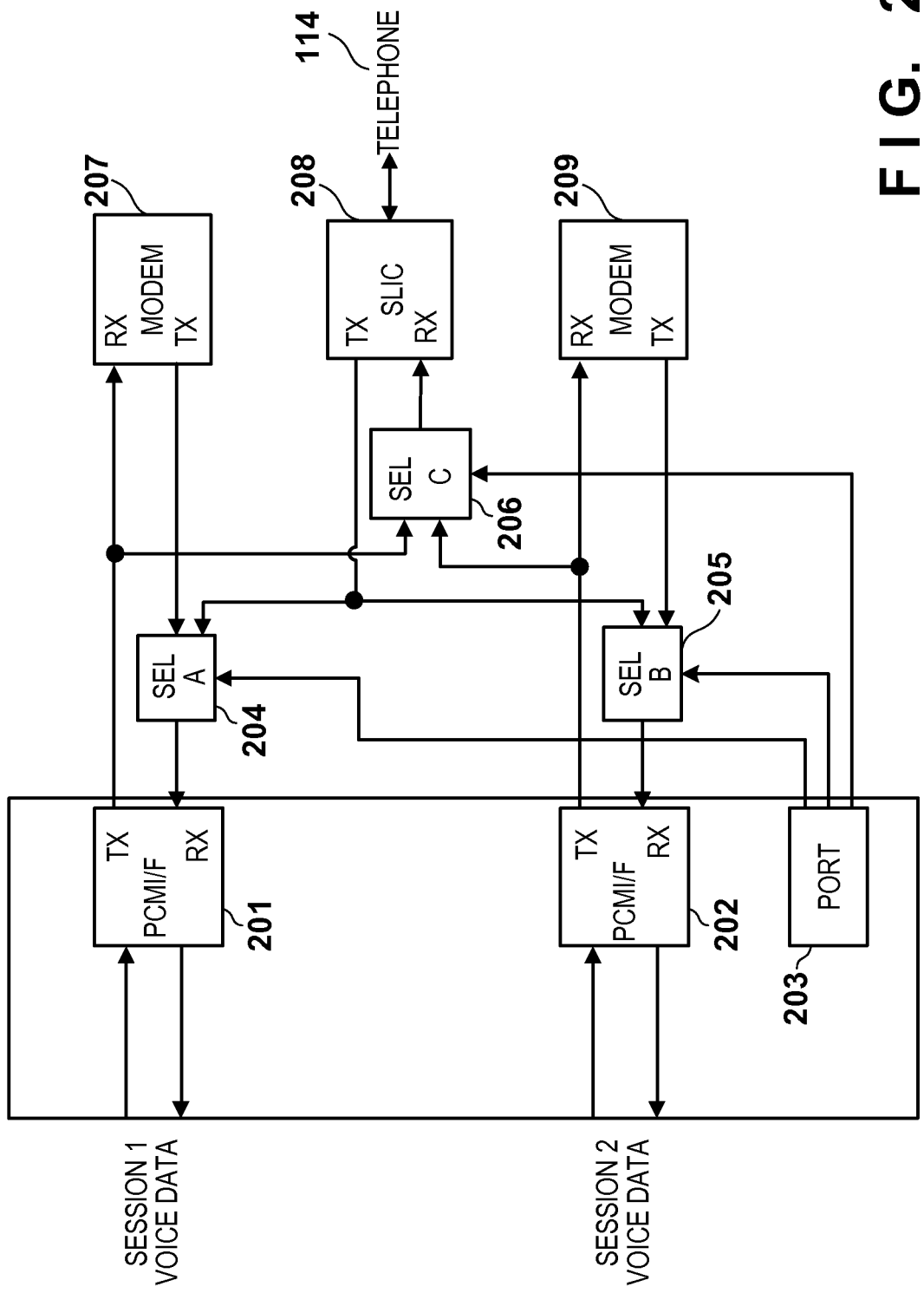
FIG. 2 is a block diagram showing details of a voice signal processor according to the embodiment.

FIG. 2 is a block diagram showing details of the voice signal processor 113 according to the embodiment.

The voice signal processor 113 inputs (RX) and outputs (TX) the voice signals divided for each session to and from the IP packet generation/analysis unit 106, as described above. In this example, the signal of the first session is connected to a PCM I/F 201 and the signal of the second session is connected to a PCM I/F 202.

The PCM I/Fs 201 and 202 perform parallel-to-serial conversion for converting parallel voice signals input from the IP packet generation/analysis unit 106 into serial signals processable by the SLIC 208 and modems 207 and 209 (all of which will be described later), respectively. The PCM I/Fs 201 and 202 also perform serial-to-parallel conversion to transfer serial signals from the SLIC 208 and modems 207 and 209 to the IP packet generation/analysis unit 106. The SLIC 208 for telephone control and the modems 207 and 209 for FAX communication control can directly process G.711 (PCM) codes.

A conventional modem transmits and receives analog signals. A modem like that described in this embodiment, which can transmit and receive PCM digital signals complying with G.711 (PCM) by a digital line, has emerged. In this embodiment, such a digital model is used.

A selector (SEL_A) 204 selects one of a transmission signal (TX) from the modem 207 and a transmission signal (TX) from the SLIC 208 as a reception signal (RX) of the PCM I/F 201. A selector (SEL_B) 205 selects one of a transmission signal (TX) from the modem 209 and a transmission signal (TX) from the SLIC 208 as a reception signal (RX) of the PCM I/F 202. A selector (SEL_C) 206 selects one of a transmission signal (TX) from the PCM I/F 201 and a transmission signal from the PCM I/F 202 as a reception signal (RX) of the SLIC 208. A control signal for switching the selected state of each selector is connected to a port 203. Selection of each selector is controlled by controlling the port 203.

The voice signal processor 113 switches between the two sessions. That is, in the case of FAX communication, the selectors 204 and 205 connect the PCM I/F 201 and modem 207, and the PCM I/F 202 and modem 209, respectively, thereby performing communication using a T.30 FAX deemed voice.

On the other hand, to perform voice communication, the selector 204 or 205 connects the transmission signal (TX) of the SLIC 208 as the reception signal (RX) of the PCM I/F 201 or 202. Since one telephone is connected, the selector 206 controls whether to use the PCM I/F 201 or 202.

The operation of the image communication apparatus 101 according to the embodiment will be described with reference to FIG. 3.

Figure 3:
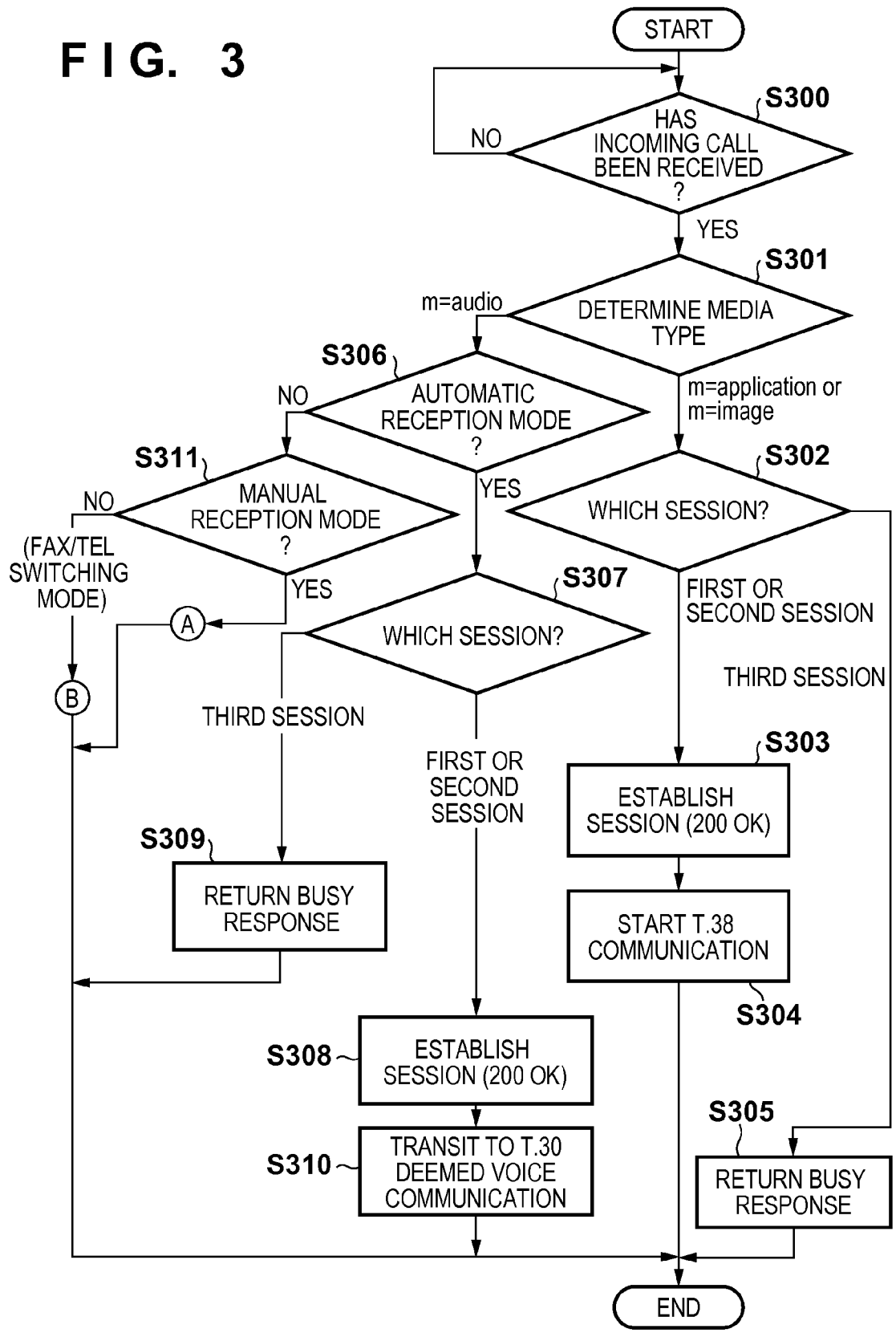
FIG. 3 is a flowchart for describing incoming call processing executed by the image communication apparatus according to the embodiment.

FIG. 3 is a flowchart for describing incoming call processing executed by the image communication apparatus 101 according to the first embodiment. Note that a program for executing processing shown in the flowchart is stored in the ROM 108. The CPU 102 executes the program, thereby implementing the processing.

In step S300, the CPU 102 determines whether an incoming call has been received. This determination is performed by determining whether the network I/F unit 112 has received an INVITE signal of the SIP procedure from the IP network. If the CPU 102 determines that an incoming call has been received, the process advances to step S301, and the CPU 102 determines the media type of the INVITE signal.

FIGS. 14A and 14B depict views each showing an example of the INVITE signal of SIP. FIG. 14A shows an INVITE signal when an incoming audio call is received. FIG. 14B shows an INVITE signal for T.38 communication. The INVITE signal includes not only "From" information indicating a call source and "To" information indicating a voice communication destination but also media type information starting with "m=".

If information following "m=" is "audio", it indicates an incoming audio (voice) call. Alternatively, if the information is "application" or "image", it indicates T.38 communication by a digital data signal.

In step S301, the CPU 102 determines the information following "m=". If the information is "application" or "image", the process advances to step S302. In step S302, the CPU 102 determines the ordinal number of a session. If the incoming call is of the first or second session, the process advances to step S303 to establish a session. The process then advances to step S304, and the CPU 102 starts T.38 FAX communication. The session is established by outputting a 200 OK signal from the network I/F unit 112 to the IP network as a response signal to the INVITE signal.

On the other hand, if the CPU 102 determines in step S302 that the incoming call is of the third session, the two sessions have already been fully used and a new session cannot be accepted. The process thus advances to step S305. In step S305, the CPU 102 rejects the incoming call by sending a busy signal (an SIP signal "486 busy here") to the IP network.

On the other hand, if the CPU 102 determines in step S301 that the media type is audio (m=audio), the process advances to step S306 to determine a communication mode. If the CPU 102 determines in step S306 that the communication is the automatic reception mode, the process advances to step S307, and the CPU 102 determines the ordinal number of the session of the incoming call. If the incoming call is of the first or second session, the process advances to step S308, and the CPU 102 establishes a session. The process then advances to step S310, and the CPU 102 transits to T.30 FAX deemed voice communication. Note that the session is established in step S308 by outputting a 200 OK signal from the network I/F unit 112 to the IP network as a response signal to the INVITE signal. For example, if the incoming call is of the first session and the communication mode is the automatic reception mode, the voice signal processor 113 connects the data of the first session to the PCM I/F 201. This connects the transmission signal (TX) from the PCM I/F 201 to the reception signal (RX) of the modem 207, and connects the transmission signal (TX) from the modem 207 to the reception signal (RX) of the PCM I/F 201 via the selector 204.

Alternatively, if the incoming call is of the second session, the data of the second session is connected to the PCM I/F 202. This connects the transmission signal (TX) from the PCM I/F 202 to the reception signal (RX) of the modem 209, and connects the transmission signal (TX) from the modem 209 to the reception signal (RX) of the PCM I/F 202 via the selector 205. With this processing, T.30 FAX deemed voice communication is performed using the first or second session.

If it is determined in step S307 that the incoming call is of the third session, the two sessions have already been fully used and a new session cannot be accepted. The process thus advances to step S309. In step S309, the CPU 102 rejects the incoming call by sending a busy signal (an SIP signal "486 busy here") to the IP network.

If the CPU 102 determines in step S306 that the communication mode is not the automatic reception mode, the process advances to step S311, and the CPU 102 determines whether the communication mode is the manual reception mode. If the CPU 102 determines that the communication mode is the manual reception mode, the process advances to step S400 of FIG. 4. Alternatively, if the CPU 102 determines that the communication mode is not the manual reception mode, that is, the communication mode is the FAX/TEL switching mode, the process advances to step S700 of FIG. 7.

Incoming call processing executed by the image communication apparatus 101 when the communication mode has been set to the manual reception mode will be described next with reference to FIGS. 4 to 6.

Figure 4:
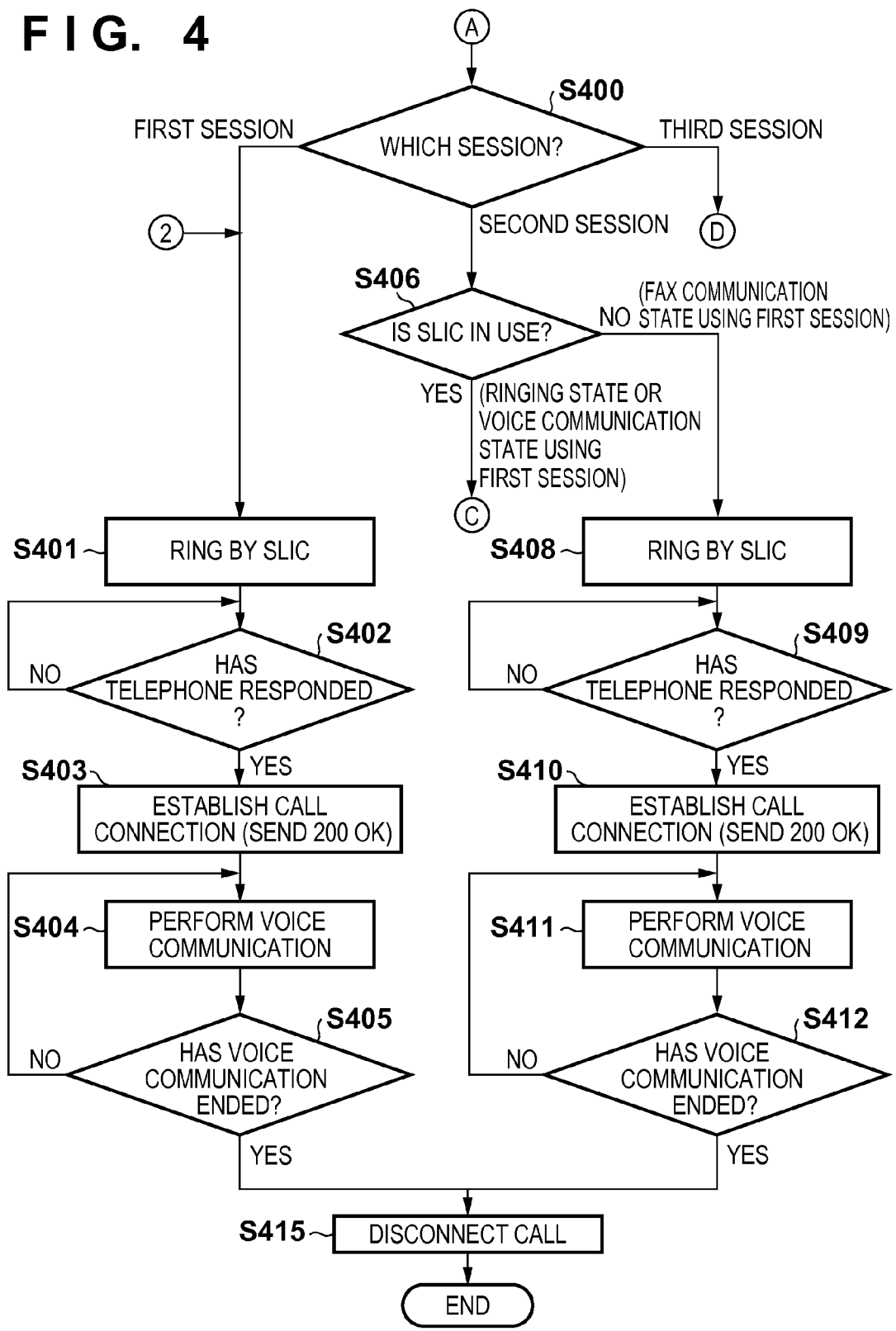
FIG. 4 is a flowchart for describing processing when the image communication apparatus receives an incoming audio call in the manual reception mode according to the embodiment.

FIG. 4 is a flowchart for describing processing when the image communication apparatus 101 receives an incoming audio call in the manual reception mode according to the first embodiment.

In step S400 of FIG. 4, the CPU 102 determines the ordinal number of the session of the incoming call. If the CPU 102 determines that the incoming call is of the first session, the process advances to step S401, and the CPU 102 uses the telephone ringing function of the SLIC 208 to cause the telephone 114 connected to the SLIC 208 to ring for the incoming call. The process advances to step S402, and the CPU 102 determines whether the telephone has responded. Whether the telephone has responded is determined depending on whether an off-hook operation of the telephone 114 has been detected. The SLIC 208 performs off-hook detection. If the CPU 102 determines in step S402 that the telephone has responded, the process advances to step S403 to establish a call connection (session). The session is established by sending an SIP signal "200 OK" to the IP network. After that, the process advances to step S404 to enter a voice communication state.

At the time of voice communication of the first session, the voice signal processor 113 is controlled as follows. The voice signal processor 113 connects the data of the first session to the PCM I/F 201, and the transmission signal (TX) from the PCM I/F 201 is connected to not only the reception signal (RX) of the modem 207 but also the reception signal (RX) of the SLIC 208 via the selector 206. Furthermore, the transmission signal (TX) of the SLIC 208 is connected to the reception signal (RX) of the PCM I/F 201 via the selector 204. With this processing, voice communication is performed using the first session.

If the off-hook detection function of the SLIC 208 detects an on-hook operation of the connected telephone 114 in step S405, it is determined that the voice communication has ended, and the process advances to step S415, thereby sending an SIP signal BYE to disconnect the call. Note that if no on-hook operation is detected in step S405, the process returns to step S404 to continue the voice communication.

On the other hand, if the CPU 102 determines in step S400 that the incoming call is of the second session, the process advances to step S406 to determines whether the SLIC 208 is in use (that is, whether the telephone 114 is in use). If the CPU 102 determines that the SLIC 208 is in used, the telephone is in a ringing state or voice communication state using the first session, and the process advances to step S500 of FIG. 5.

On the other hand, if the CPU 102 determines in step S406 that the SLIC 208 is not in use, the process advances to step S408, and the CPU 102 uses the telephone ringing function of the SLIC 208 to cause the telephone 114 connected to the SLIC 208 to ring. In step S409, by using the off-hook detection unit of the SLIC 208 for the telephone 114, the CPU 102 determines whether the telephone has responded. If an off-hook operation is detected in step S409, the process advances to step S410, and the CPU 102 establishes a call connection (session) by sending an SIP signal "200 OK" to the IP network. The process then advances to step S411 to transit to a voice communication state. If the off-hook detection function of the SLIC 208 detects an on-hook operation of the connected telephone 114 in step S412, it is determined that the voice communication has ended, and the process advances to step S415.

In steps S408 to S412, FAX communication has already been performed using the first session. Therefore, the signal of the audio call is input to the unused PCM I/F 201 or 202 which has not been used for FAX communication. This is done by connecting the PCM I/F 201 or 202 and the SLIC 208 via the selector 204 or 205 and the selector 206.

Processing when the communication mode is the manual reception mode, the incoming audio call is of the second session, and the telephone is in use will be described with reference to a flowchart shown in FIG. 5.

Figure 5:
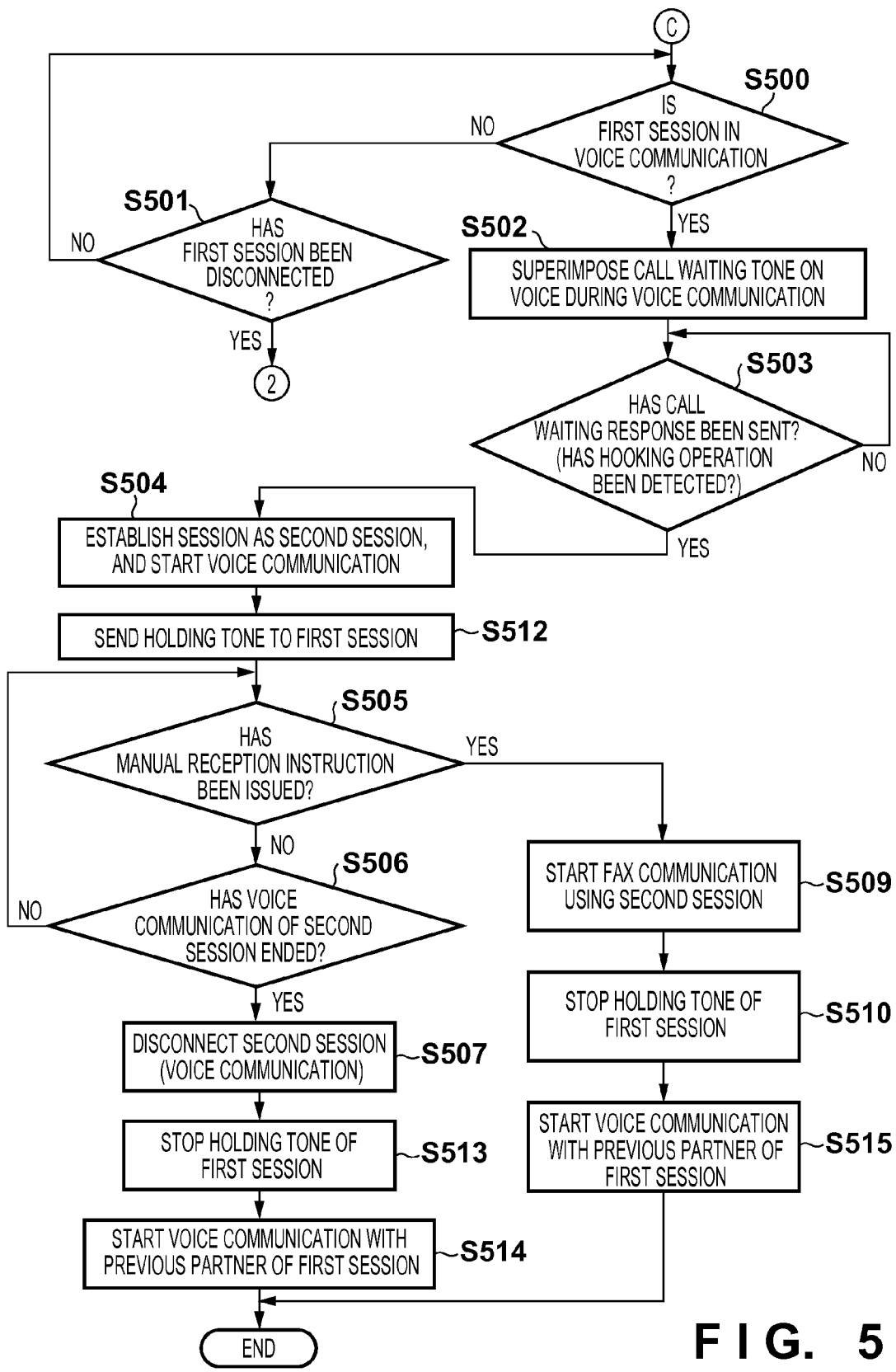
FIG. 5 is a flowchart for describing processing when the image communication apparatus is in the manual reception mode, the incoming audio call is of the second session, and a telephone is in use according to the embodiment.

FIG. 5 is a flowchart for describing the processing when the image communication apparatus 101 is in the manual reception mode, the incoming audio call is of the second session, and the telephone is in use according to the first embodiment.

In step S500, the CPU 102 determines whether the first session is in voice communication. This can be determined depending on whether ringing of the telephone 114 by the SLIC 208 has ended and the SLIC 208 has detected an off-hook operation of the telephone 114. If the CPU 102 determines that the first session is not in voice communication, that is, the telephone is in a ringing state, the process advances to step S501, and the CPU 102 determines whether the first session has been disconnected. If the first session has been disconnected, it indicates that the voice communication of the first session has ended, and the process advances to step S401 of FIG. 4. On the other hand, if the CPU 102 determines that the first session has not been disconnected, the process returns to step S500 to stand by for the first session to become in voice communication. If the CPU 102 detects in step S500 that the first session is in voice communication, the process advances to step S502 to perform a pseudo call waiting operation.

Figure 10:
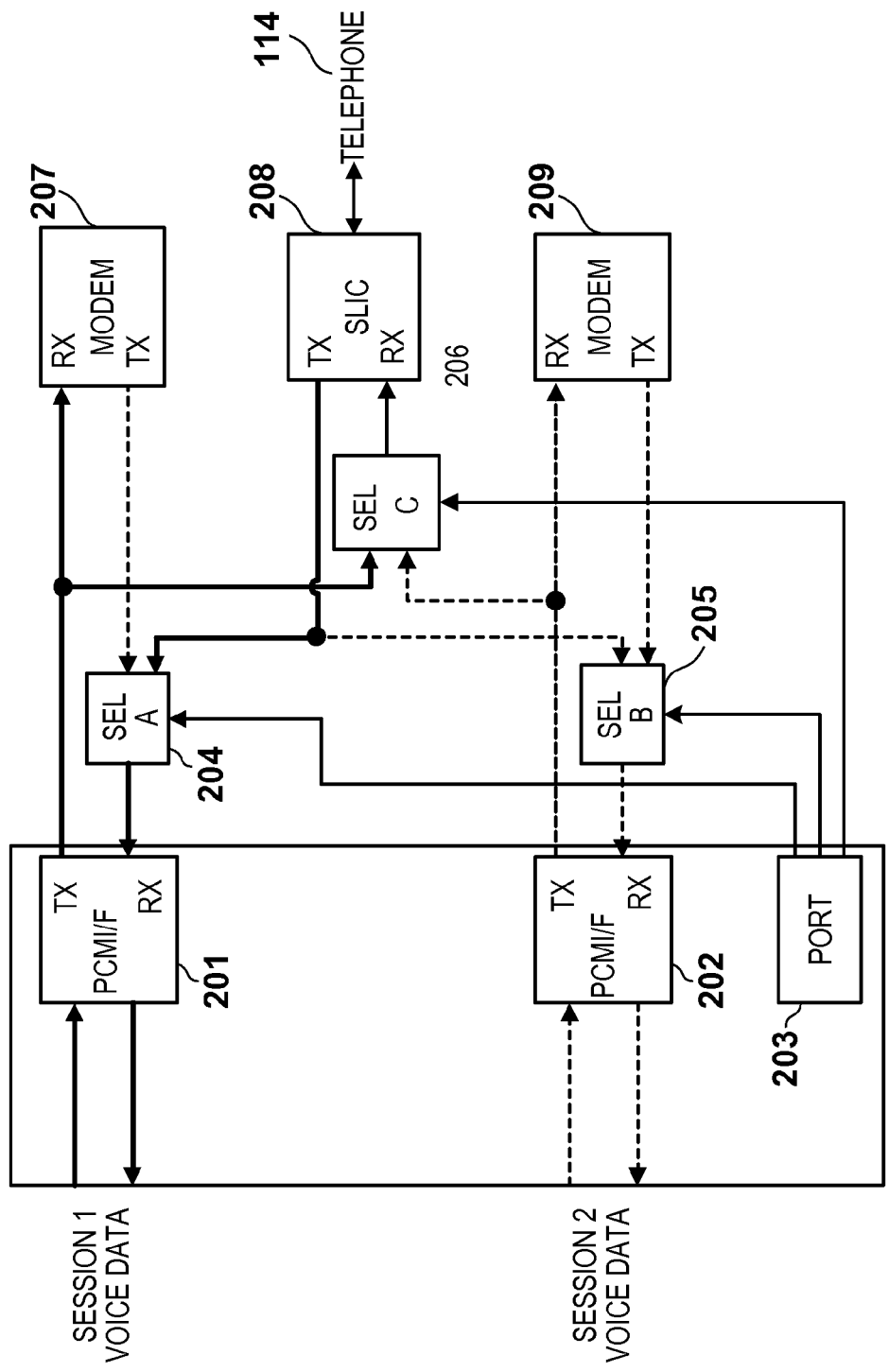
FIG. 10 depicts a view for explaining the connection state of the voice signal processor in a pseudo call waiting operation.

FIG. 10 depicts a view for explaining the connection state of the voice signal processor 113 in the pseudo call waiting operation. In FIG. 10, connected devices are indicated by thick lines.

Referring to FIG. 10, since the first session is in voice communication, the data of the first session is transmitted between the PCM I/F 201 and the SLIC 208. The selector 206 is controlled to connect the transmission signal (TX) of the PCM I/F 201 to the reception signal (RX) of the SLIC 208. The selector 204 is controlled to connect the transmission signal (TX) of the SLIC 208 to the reception signal (RX) of the PCM I/F 201. In this state, the data of the first session is connected by the path of the SLIC 208 and the telephone 114 via the PCM I/F 201, thereby allowing voice communication by the telephone 114.

At this time, if an incoming audio call is received from the IP network, and the CPU 102 determines in step S500 that the first session is in voice communication, the process advances to step S502. In step S502, the CPU 102 superimposes, on the voice of the telephone 114 connected to the SLIC 208, a tone (incoming call display tone) for notifying that the incoming audio call has been received during voice communication, by using the voice signal superimposition function of the SLIC 208. In step S503, the CPU 102 determines whether the telephone 114 has sent a call waiting response. This function also uses the hook detection unit of the SLIC 208 during voice communication. If a hooking operation is detected, the process advances to step S504.

In step S504, the CPU 102 sends an SIP signal "200 OK" to the IP network, establishes a session as the second session, and starts voice communication with the partner of the second session. The process advances to step S512, and the CPU 102 performs an operation of sending a holding tone to the partner of the first session.

This operation will be described with reference to FIG. 11.

Figure 11:
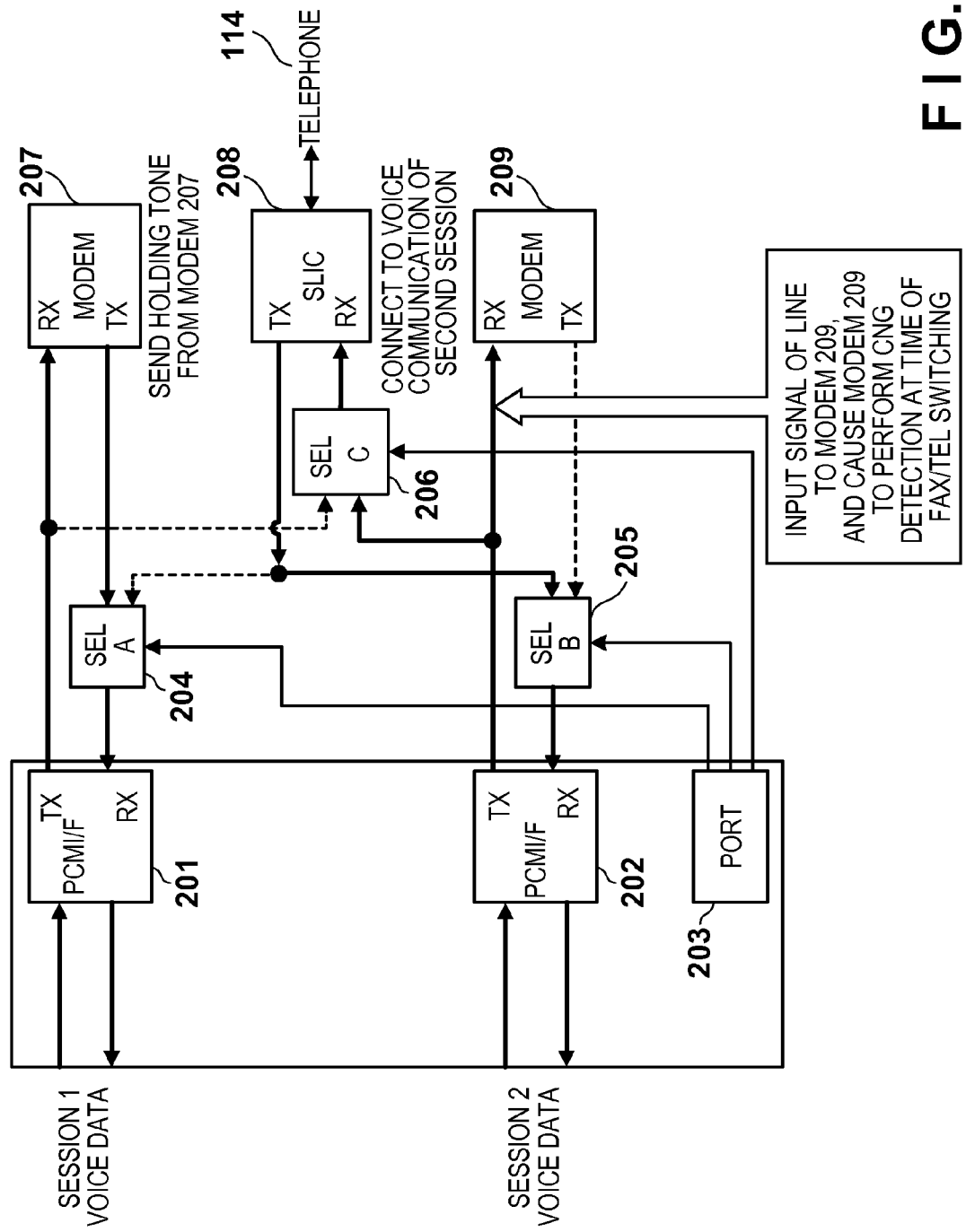
FIG. 11 depicts a view showing a state in which the image communication apparatus performs a pseudo call waiting operation during voice communication with the first session according to the embodiment.

FIG. 11 depicts a view showing a state in which a pseudo call waiting operation is performed while the image communication apparatus 101 is in voice communication with the first session according to the first embodiment. FIG. 11 shows a connection state following the state shown in FIG. 10.

To perform voice communication with the partner of the second session, the voice data of the second session is connected to the telephone 114 via the PCM I/F 202 and the SLIC 208. To do this, the selector 206 is controlled to connect the transmission signal (TX) of the PCM I/F 202 to the reception signal (RX) of the SLIC 208. The selector 205 is controlled to connect the transmission signal (TX) of the SLIC 208 to the reception signal (RX) of the PCM I/F 202. This allows voice communication with the partner of the second session.

Furthermore, with respect to the first session, the voice data of the first session is connected to the PCM I/F 201 and the modem 207. To do this, the selector 204 is controlled to connect not the transmission signal of the SLIC 208 but the transmission signal (TX) of the modem 207 to the reception signal (RX) of the PCM I/F 201.

In this state, by using the tone signal output function of the modem 207, the voice communication destination of the first session is made to listen, via the modem 207 and the PCM I/F 201, a voice signal (=holding tone) output from the modem 207. This makes it possible to notify the caller of the first session that the first session has been put on hold. A pseudo call waiting function implemented in the image communication apparatus 101 has been explained above.

The pseudo call waiting function is a function of implementing, in the image communication apparatus 101, a call waiting function (a notification function of an incoming call during voice communication) supported by the network (carrier) without using the service of the network. That is, when an incoming audio voice communication of the second session is received, the function superimposes an incoming call display tone on a voice during voice communication in the image communication apparatus 101. If the telephone responds to the interrupt call, the function switches the apparatus to the interrupt call to perform voice communication, and sends a holding tone from the image communication apparatus 101 to the first voice communication partner. Furthermore, if disconnection of the interrupt call is detected, the function disconnects the session of the interrupt call, stops sending the holding tone to the first voice communication partner, and returns the apparatus to the voice communication with the first voice communication partner.

Referring back to FIG. 5, the CPU 102 determines in step S505 whether a manual reception instruction has been issued. In this example, since the apparatus is in the manual reception mode, and thus a "manual reception" start button for instructing manual reception and the like are displayed on the image communication apparatus 101, whether a manual reception instruction has been issued can be determined depending on whether the user has pressed the button. If the CPU 102 determines that manual reception has been instructed, the process advances to step S509, and the CPU 102 starts FAX communication using the second session which is in voice communication. In step S510, the CPU 102 stops the holding tone of the first session. The process advances to step S515, and the CPU 102 restarts the voice communication with the previous voice communication destination using the first session.

The above-described control processing will be explained with reference to FIG. 12.

Figure 12:
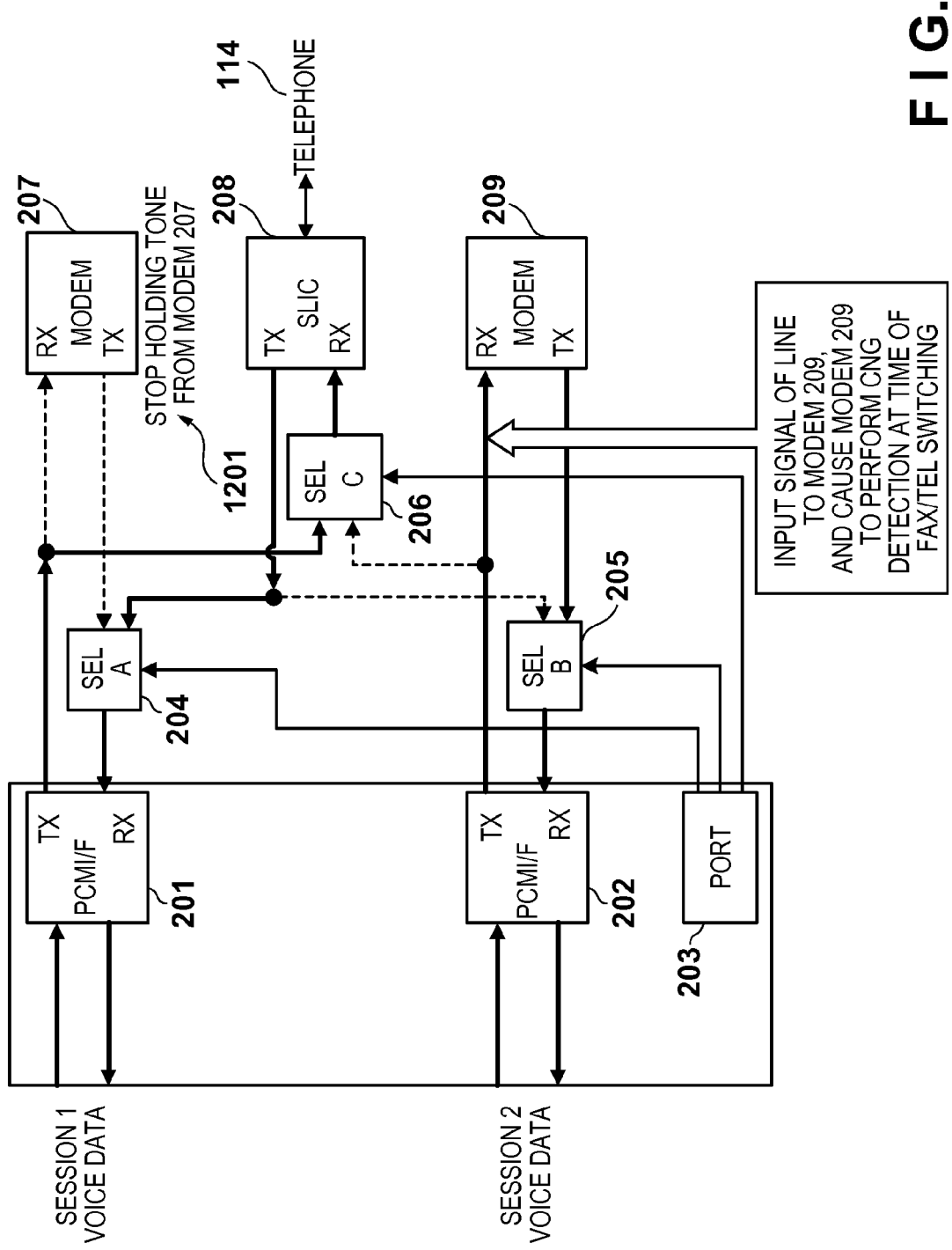
FIG. 12 depicts a view for explaining processing of transiting to FAX reception in the pseudo call waiting operation when the image communication apparatus receives an interrupt call during voice communication with the first session according to the embodiment.

FIG. 12 depicts a view for explaining processing of transiting to FAX reception in the pseudo call waiting operation when the image communication apparatus 101 receives an interrupt call during voice communication using the first session according to the first embodiment.

First, to switch the voice communication of the second session to FAX communication, the voice data of the second session is input to the modem 209 via the PCM I/F 202. More specifically, the selector 205 connects the transmission signal (TX) of the modem 209 to the reception signal (RX) of the PCM I/F 202. Furthermore, the selector 206 reconnects the transmission signal (TX) of the PCM I/F 201 to the reception signal (RX) of the SLIC 208. This connection allows FAX communication using the second session, as described in step S509 of FIG. 5.

On the other hand, with respect to the first session, the holding tone output from the modem 207 is stopped, and the PCM I/F 201 connected to the modem 207 is disconnected, thereby reconnecting the PCM I/F 201 and the SLIC 208. More specifically, the selector 204 connects the transmission signal (TX) of the SLIC 208 to the reception signal (RX) of the PCM I/F 201, and the selector 206 connects the transmission signal (TX) of the PCM I/F 201 to the reception signal (RX) of the SLIC 208. This allows the voice communication of the first session to restart.

Furthermore, if the CPU 102 determines in step S505 of FIG. 5 that no manual reception has been instructed, the process advances to step S506, the CPU 102 determines whether the voice communication of the second session has ended. This is determined depending on whether the voice communication destination has been disconnected or the hook detection function of the SLIC 208 for the connected telephone 114 has detected an on-hook operation. If the CPU 102 determines in step S506 that the voice communication of the second session has ended, the process advances to step S507; otherwise, the process advances to step S505.

The call waiting function can incorporate a function of switching to the previous caller by placing the interrupt caller on hold, when a short on-hook (hooking) operation is detected at this timing. A description of details of this operation will be omitted. In this case, the holding tone output to the caller of the interrupt call is stopped, and the session data of the previous caller is connected to the SLIC 208. Furthermore, the session data of the caller of the interrupt call is connected to the modem 207 or 209, thereby outputting a holding tone from the modem 207 or 209.

If the CPU 102 detects the end of the voice communication in step S506, the process advances to step S507, and the CPU 102 disconnects the voice communication of the second session (sends an SIP signal BYE to the IP network). The process advances to step S513, and the CPU 102 stops the holding tone of the first session output from the modem 207. In step S514, the CPU 102 restarts the voice communication with the voice communication partner of the first session. The voice communication can be restarted by returning to the connection described with reference to FIG. 10. In this way, it is possible to restart the voice communication of the first session.

As described above, when an incoming audio call is received during voice communication using the first session, the pseudo call waiting function can be used to switch the incoming audio call to voice communication or FAX reception.

The operation when an incoming audio call of the third session is received in FIG. 4 (processing D of FIG. 4) will be described with referenced to FIG. 6.

Figure 6:
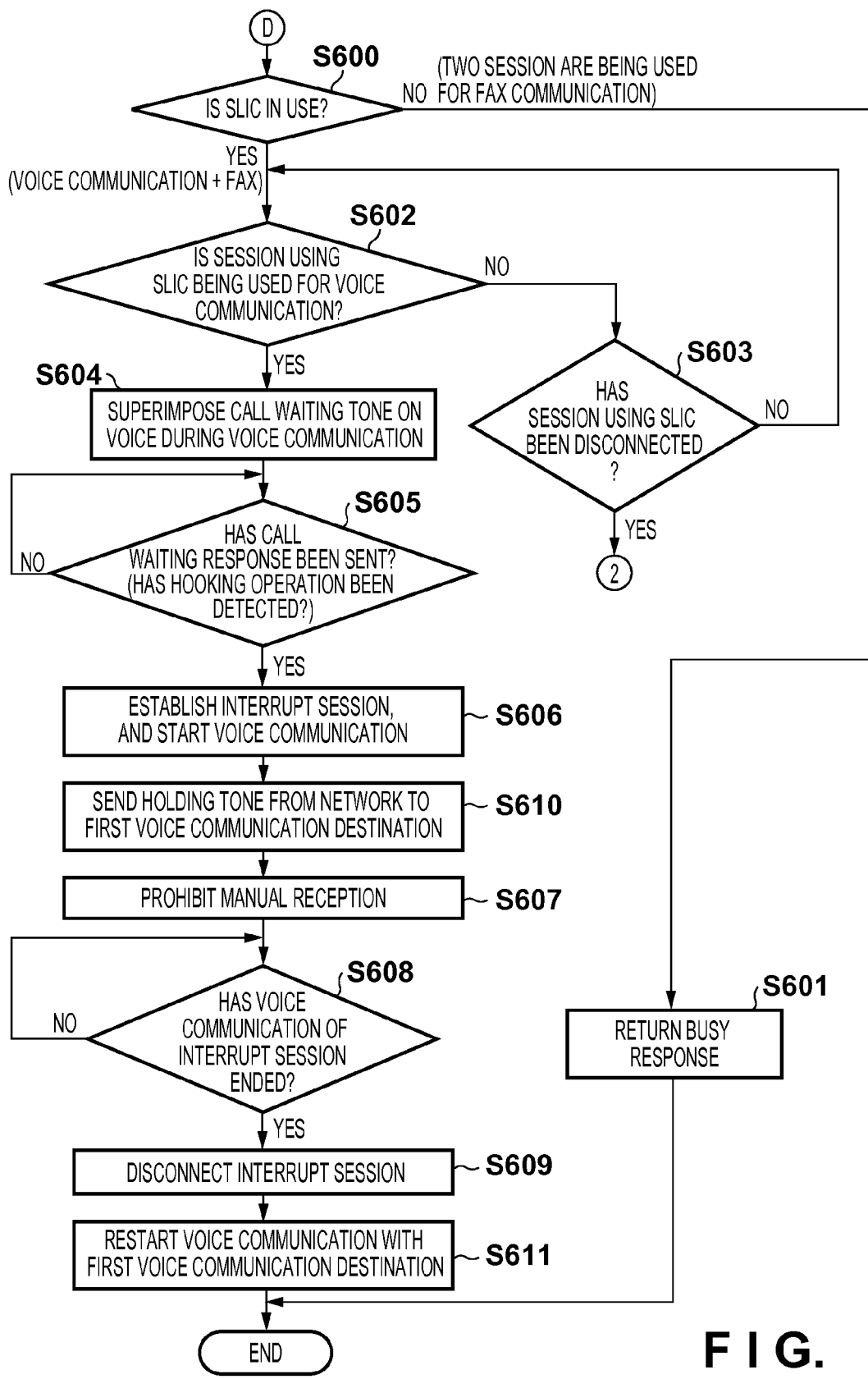
FIG. 6 is a flowchart for describing processing when the image communication apparatus is in the manual reception mode and the incoming audio call is of the third session according to the embodiment.

FIG. 6 is a flowchart for describing processing when the image communication apparatus 101 is in the manual reception mode and the incoming audio call is of the third session according to the embodiment. In this case, since the two sessions have already been fully used, the incoming call is assumed to be an incoming call with call waiting by the NGN line.

In step S600, the CPU 102 determines whether the SLIC 208 is in use. If the SLIC 208 is not in use, the two sessions are being used for FAX communication. Therefore, in step S601, the CPU 102 returns a busy response (sends an SIP signal "486 busy here") to the NGN network, thereby rejecting the incoming call of the third session.

Figure 13:
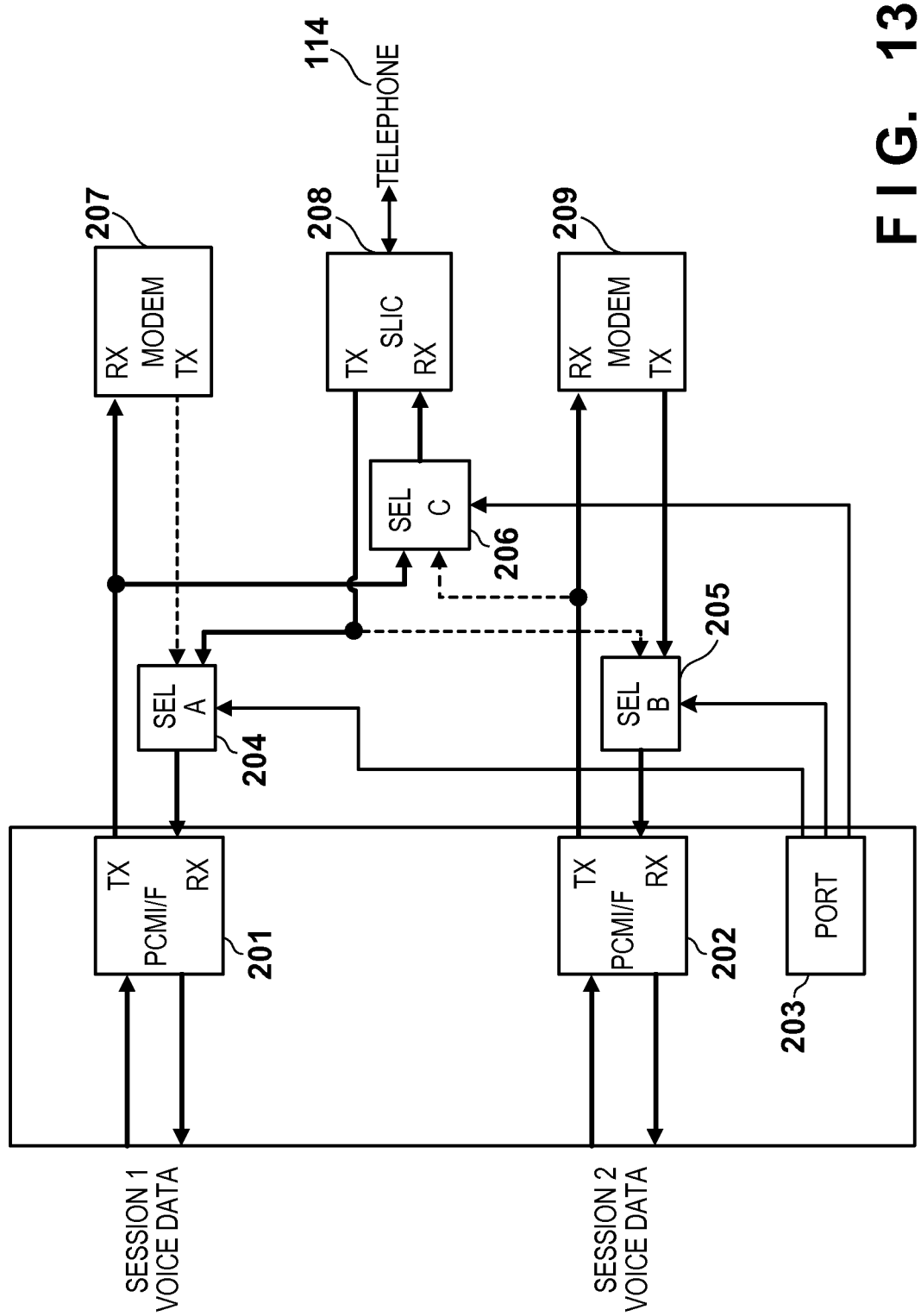
FIG. 13 depicts a view for explaining processing of transiting to an interrupt incoming call in the call waiting operation while the image communication apparatus is in voice communication with the first session and performing FAX communication with the second session according to the embodiment.

On the other hand, if the CPU 102 determines in step S600 that the SLIC 208 is in use, the two sessions are being used for voice communication and FAX communication. In this case, the process advances to step S602, and the CPU 102 determines whether the session using the SLIC 208 has transited to a voice communication state. This can be determined depending on whether ringing of the telephone 114 by the SLIC 208 has ended and the SLIC 208 has detected an off-hook operation of the telephone 114. If the CPU 102 determines that the session is not in voice communication, that is, the telephone is in a ringing state, the process advances to step S603 and the CPU 102 determines whether the session using the SLIC 208 has been disconnected. If the CPU 102 determines that the session using the SLIC 208 has been disconnected, it indicates that the voice communication has ended and thus the process returns to step S401 of FIG. 4. On the other hand, if the CPU 102 determines that the session using the SLIC 208 has not been disconnected, the process returns to step S602 to stand by for the session using the SLIC 208 to become in voice communication. If the CPU 102 detects in step S602 that the session using the SLIC 208 is in voice communication, a call waiting operation is performed in step S604 and subsequent steps. FIG. 13 shows the connection state of the voice signal processor 113 in this case.

FIG. 13 depicts a view for explaining processing of transiting to an interrupt incoming call in the call waiting operation while the image communication apparatus 101 is in voice communication using the first session and performing FAX communication using the second session according to the first embodiment.

In this example, in processing of the voice data of the first session, the PCM I/F 201 and the SLIC 208 are connected to each other to perform voice communication using the first session. To do this, the selector 204 connects the transmission signal (TX) of the SLIC 208 to the reception signal (RX) of the PCM I/F 201, and the selector 206 connects the transmission signal (TX) of the PCM I/F 201 to the reception signal (RX) of the SLIC 208.

With respect to the data of the second session, the PCM I/F 202 and the modem 209 are connected to each other to perform FAX communication using the second session. To do this, the selector 205 connects the transmission signal (TX) of the modem 209 to the reception signal (RX) of the PCM I/F 202, and connects the transmission signal (TX) of the PCM I/F 202 to the reception signal (RX) of the modem 209.

In the connection shown in FIG. 13, the data of the first session is voice data, and the data of the second session is T.30 FAX deemed voice communication data. The present invention, however, is not specifically limited to this. That is, the data of the first session may be T.30 FAX deemed voice communication data and the data of the second session may be voice data. In this case, for the data of the first session, the PCM I/F 201 and the modem 207 are connected. For the data of the second session, the PCM I/F 202 and the SLIC 208 are connected.

As described above, when the two sessions have been fully used, an incoming call with call waiting is accepted from the NGN network (an INVITE signal as an SIP signal is accepted). With this processing, the voice signal superimposition function of the SLIC 208 during voice communication superimposes a notification (incoming call display tone) of the incoming call on a voice during voice communication. In this state, the hook detection function of the SLIC 208 for the connected telephone 114 detects a hooking operation (call waiting response detection in step S605 of FIG. 6). If a call waiting response is detected in step S605, the process advances to step S606 to stop the incoming call display tone, thereby establishing a session for the interrupt call. More specifically, the CPU 102 sends a 200 OK signal as an SIP signal to the NGN network. This causes the NGN network to set the voice communication of the first session in a holding state, and transmit a holding tone to the voice communication partner of the first session in step S610, thereby setting the incoming call with call waiting in a voice communication state.

The process advances to step S607 of FIG. 6, and the CPU 102 prohibits manual reception. This is done by, for example, preventing the above-described "manual reception" button from being displayed. The purpose of prohibiting manual reception is as follows. That is, if the incoming call with call waiting is caused to transit to FAX communication while the two sessions fully operate, the FAX communication does not end within a short time, and the first voice communication partner who is on hold needs to wait a long time. This results in an unnecessary line connection, thereby raising a connection fee. The purpose is to prevent this.

The process advances to step S608, and the CPU 102 determines whether the voice communication of the interrupt session has ended. This can be determined depending on whether the hook detection function of the SLIC 208 has detected an on-hook operation of the connected telephone 114. If an on-hook operation has been detected, the process advances to step S609, and the CPU 102 terminates the voice communication of the interrupt session. In step S611, the CPU 102 sends an SIP signal BYE to the NGN network using the session. Upon receiving the signal, the NGN network disconnects the voice communication of the interrupt session, and switches to the first voice communication partner.

Note that the call waiting function includes a function of switching to the previous caller by placing the interrupt caller on hold, when a short on-hook (hooking) operation is detected at this timing. In this case, the NGN network side performs switching by outputting an SIP signal defied by the call waiting service of the NGN to the IP network. In this way, the voice communication with the first voice communication partner restarts.

As described above, according to this embodiment, even if an incoming audio call (an incoming call with call waiting) is received while the two sessions are fully used, it is possible to perform voice communication using the call waiting function of the network.

In this embodiment, transition to FAX reception by an interrupt call is prohibited. Therefore, it is possible to prevent the first voice communication partner from being kept on hold for a long time, and prevent an unnecessary communication fee from being charged.

Processing (B) when the CPU 102 determines in step S311 of FIG. 3 that the reception mode is the FAX/TEL switching mode will be described with reference to a flowchart shown in FIG. 7.

Figure 7:
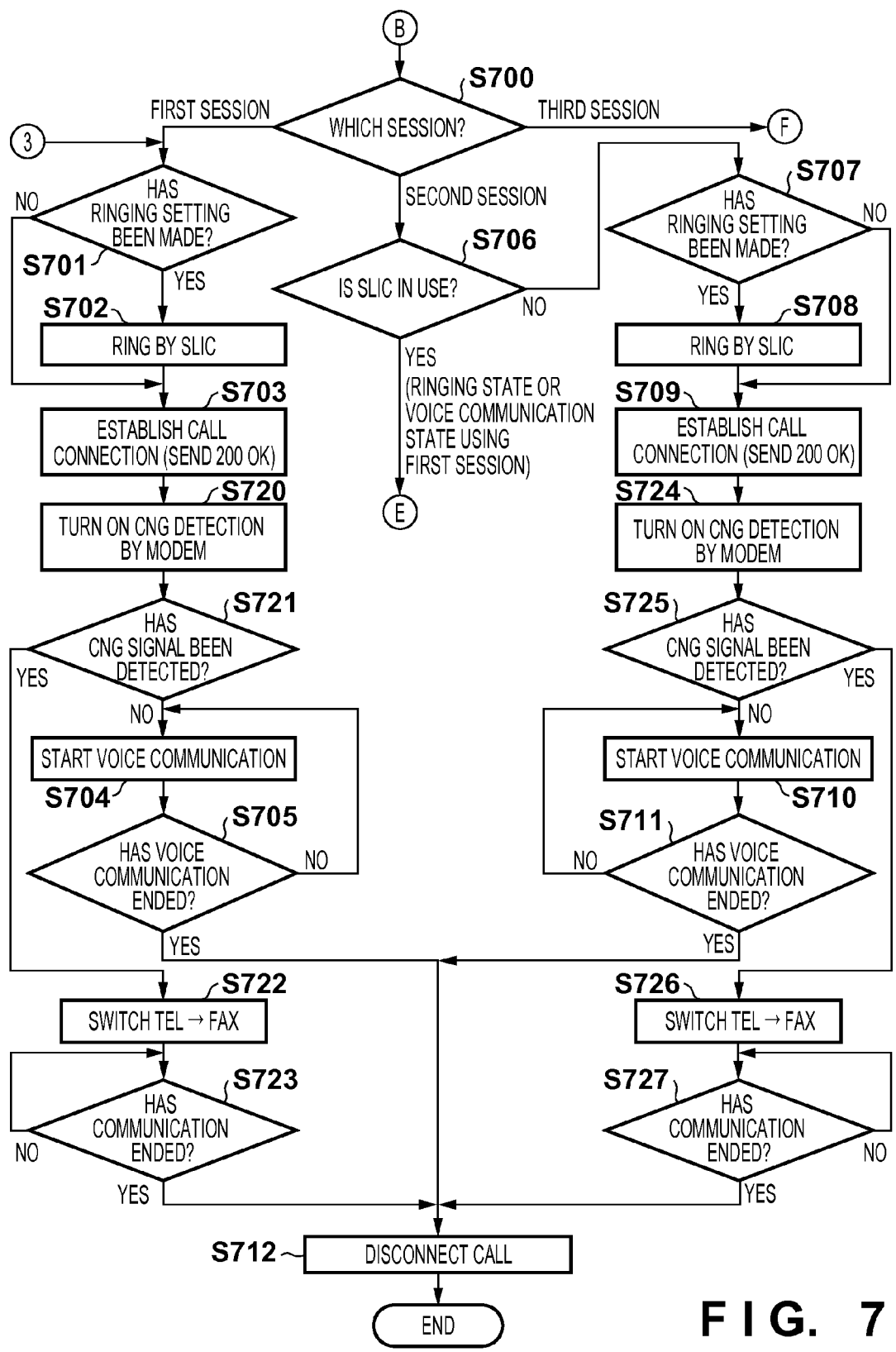
FIG. 7 is a flowchart for describing processing when the image communication apparatus is in the FAX/TEL switching mode according to the embodiment.

FIG. 7 is a flowchart for describing processing when the image communication apparatus 101 is in the FAX/TEL switching mode according to the embodiment.

In step S700, the CPU 102 determines the ordinal number of the session of the incoming call. If the CPU 102 determines that the incoming call is of the first session, the process advances to step S701, and the CPU 102 determines whether an incoming call ringing setting has been made in the FAX/TEL switching mode. The incoming call ringing setting instructs ringing of the telephone before a call connection is established for FAX/TEL switching. If the ringing has been set, the process advances to step S702. In step S702, the CPU 102 uses the ringing function of the SLIC 208 to cause the telephone 114 connected to the SLIC 208 to ring for the incoming call, thereby advancing to step S703. On the other hand, if the CPU 102 determines in step S701 that a non-ringing setting has been made, the process advances to step S703 without causing the telephone 114 to ring. In step S703, the CPU 102 establishes a connection as the first session. More specifically, the CPU 102 sends a 200 OK signal as an SIP signal to the IP network. In this state, the apparatus enters a voice communication state using the first session.

After that, the FAX/TEL switching function is executed. In step S720, the tone detection function of the modem 207 or 209 starts CNG detection. In step S721, the CPU 102 determines whether a CNG signal has been detected. If a CNG signal has been detected, the process advances to step S722 to switch TEL (voice communication) to FAX reception. This switching operation can be performed by reconnecting the session data from the SLIC 208 to the modem 207 or 209. Furthermore, the CPU 102 determines in step S723 whether communication has ended by monitoring a FAX protocol signal. If communication has ended, the process advances to step S712 to disconnect the session (send an SIP signal BYE to the IP network), thereby terminating the process. On the other hand, if the CPU 102 determines in step S723 that communication has not ended, communication is continued.

If the CPU 102 determines in step S721 that no CNG signal has been detected, the process advances to step S704 to start voice communication. Then, the CPU 102 determines in step S705 whether the voice communication has ended, in accordance with hook detection by the SLIC 208. If the voice communication has ended, the process advances to step S712 to disconnect the session (send an SIP signal BYE to the IP network). On the other hand, if the CPU 102 determines in step S705 that the voice communication has not ended, the process advances to step S704 to continue the voice communication.

In the voice communication of the first session, the voice signal processor 113 is controlled as follows.

The voice signal processor 113 connects the data of the first session to the PCM I/F 201, and connects the transmission signal (TX) from the PCM I/F 201 to not only the reception signal (RX) of the modem 207 but also the reception signal (RX) of the SLIC 208. Furthermore, the transmission signal (TX) of the SLIC 208 is connected to the reception signal (RX) of the PCM I/F 201 via the selector 204. In this way, the voice communication of the first session (FAX/TEL switching) is performed.

If the CPU 102 determines in step S700 that the incoming call is of the second session, the process advances to step S706 to determine whether the SLIC 208 is in use (that is, whether the telephone 114 is in use). If the CPU 102 determines that the SLIC 208 is in use, the telephone 114 is in a ringing state or voice communication state using the first session, thereby advancing to processing (E) (step S800 of FIG. 8).

On the other hand, if the CPU 102 determines in step S706 that the SLIC 208 is not in use, the process advances to step S707 to determine whether the incoming call ringing setting has been made in the FAX/TEL switching mode. If the ringing setting has been made, the process advances to step S708, and the CPU 102 uses the ringing function of the SLIC 208 to cause the telephone 114 connected to the SLIC 208 to ring for the incoming call. On the other hand, if the CPU 102 determines in step S707 that a non-ringing setting has been made, the process advances to step S709 without causing the telephone 114 to ring. In step S709, the CPU 102 establishes a connection as the second session. More specifically, the CPU 102 sends a 200 OK signal as an SIP signal to the IP network. In this state, the apparatus enters a voice communication state using the second session. The FAX/TEL switching function is executed in step S724 and subsequent steps.

In step S724, the tone detection function of the modem 207 or 209 starts CNG detection. In step S725, the CPU 102 determines whether a CNG signal has been detected. If a CNG signal has been detected, the process advances to step S726, and the CPU 102 switches TEL (voice communication) to FAX reception. This switching operation can be performed by reconnecting the session data from the SLIC 208 to the modem 207 or 209. After that, the CPU 102 determines in step S727 whether communication has ended by monitoring a FAX protocol signal. If communication has ended, the process advances to step S712 to disconnect the session (send an SIP signal BYE to the IP network). If the CPU 102 determines in step S727 that communication has not ended, communication is continued.

On the other hand, if the CPU 102 determines in step S725 that no CNG signal has been detected, the process advances to step S710 to start voice communication. Then, the CPU 102 determines in step S711 whether the voice communication has ended, by using the hook detection function of the SLIC 208. If the voice communication has ended, the process advances to step S712 to disconnect the session (send an SIP signal BYE to the IP network). If the CPU 102 determines in step S711 that the voice communication has not ended, the process advances to step S710 to continue the voice communication.

In this example, since FAX communication has already been performed using the first session, the unused PCM I/F 201 or 202 which has not been used for FAX communication receives the signal of the incoming audio call. This is done by connecting the SLIC 208 to the PCM I/F 201 or 202 via the selector 204 or 205 and the selector 206.

An operation when the apparatus is in the FAX/TEL switching mode, the incoming audio call is of the second session, and the telephone is in use will be described with reference to FIG. 8.

Figure 8:
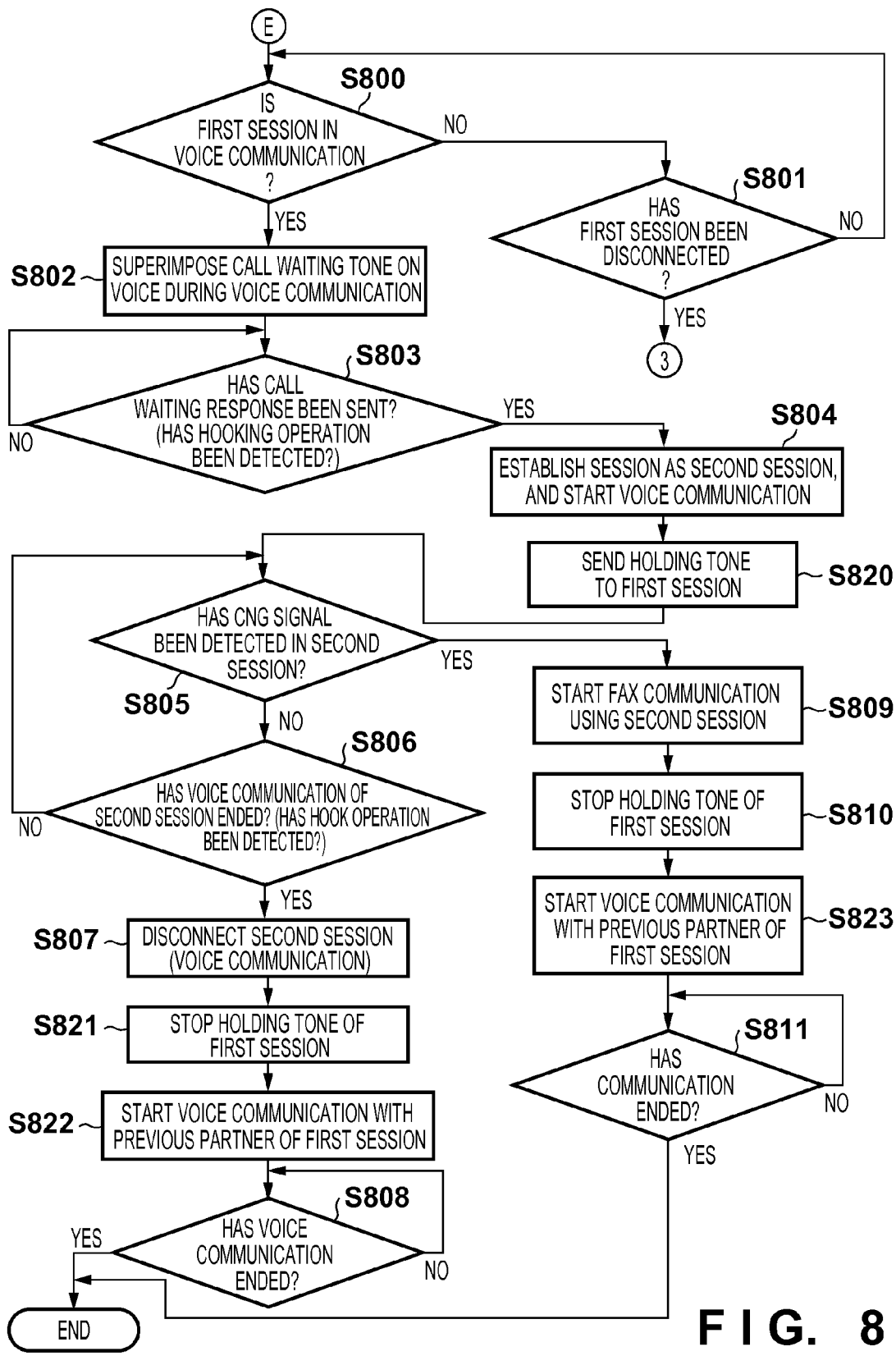
FIG. 8 is a flowchart for describing processing when the image communication apparatus is in the FAX/TEL switching mode, the incoming audio call is of the second session, and an SLIC is in use according to the embodiment.

FIG. 8 is a flowchart for describing processing when the image communication apparatus 101 is in the FAX/TEL switching mode, the incoming audio call is of the second session, and the SLIC is in use according to the embodiment.

In step S800, the CPU 102 determines whether the first session is in voice communication. This can be determined depending on whether ringing of the telephone 114 by the SLIC 208 has ended and the SLIC 208 has detected an off-hook operation of the telephone 114. If the first session is not in voice communication, that is, the telephone is in a ringing state, the process advances to step S801, and the CPU 102 determines whether the first session has been disconnected. If the first session has been disconnected, it indicates that the voice communication of the first session has ended, and the process advances to step S701 of FIG. 7. On the other hand, if the CPU 102 determines in step S801 that the first session has not been disconnected, the process returns to step S800 to stand by for the first session to become in voice communication. If the CPU 102 detects in step S800 that the first session is in voice communication, a pseudo call waiting operation is performed in step S802 and subsequent steps.

FIG. 10 depicts a view showing the connection state of the voice signal processor 113 in this case. In FIG. 10, the connected devices are indicated by solid lines.

Referring to FIG. 10, since the first session is in voice communication, the data of the first session is processed by connecting the PCM I/F 201 and the SLIC 208. The selector 206 is controlled to connect the transmission signal (TX) of the PCM I/F 201 to the reception signal (RX) of the SLIC 208. The selector 204 is controlled to connect the transmission signal (TX) of the SLIC 208 to the reception signal (RX) of the PCM I/F 201.

In this state, the data of the first session is processed by the path of the PCM I/F 201, SLIC 208, and telephone 114, thereby performing voice communication by the telephone 114.

At this time, if an incoming audio call is received from the IP network, and the CPU 102 determines in step S800 that the first session is in voice communication, the process advances to step S802. In step S802, the CPU 102 superimposes, on the voice of the telephone 114 connected to the SLIC 208, a tone (incoming call display tone) for notifying that the incoming audio call has been received, by using the voice signal superimposition function of the SLIC 208. The process advances to step S803, and the CPU 102 determines whether the telephone 114 has sent a call waiting response. This function also uses the hook detection unit of the SLIC 208 during voice communication. If a hooking operation is detected, the process advances to step S804. In step S804, the CPU 102 sends an SIP signal "200 OK" to the IP network, establishes a session as the second session, and starts voice communication with the partner of the second session. In step S820, the CPU 102 performs an operation of sending a holding tone to the partner of the first session.

This operation will be described with reference to FIG. 11. FIG. 11 shows the connection state following the state shown in FIG. 10.

To perform voice communication with the partner of the second session, the data of the second session is processed by connecting the PCM I/F 202, SLIC 208, and telephone 114. To do this, the selector 206 is controlled to connect the transmission signal (TX) of the PCM I/F 202 to the reception signal (RX) of the SLIC 208. The selector 205 is controlled to connect the transmission signal (TX) of the SLIC 208 to the reception signal (RX) of the PCM I/F 202. This allows voice communication with the partner of the second session.

Furthermore, with respect to the first session, the data of the first session is processed by connecting the PCM I/F 201 and the modem 207. To do this, the selector 204 is controlled to connect the reception signal (RX) of the PCM I/F 201 to the transmission signal (TX) of the modem 207 instead of the SLIC 208.

In this state, by using the voice signal output function of the modem 207, the voice communication destination of the first session is made to listen, via the modem 207, the PCM I/F 201, and the data of the first session, a voice signal (=holding tone) output from the modem 207. This makes it possible to notify the caller of the first session that the voice communication of the first session has been put on hold.

The pseudo call waiting function implemented in the apparatus has been explained above.

Referring back to FIG. 8, the CPU 102 determines in step S805 whether a CNG signal as a FAX initial identification signal has been detected in the second session.

The transmission signal (TX) of the PCM I/F 202 of FIG. 11 is input to the reception signal (RX) of the modem 209, and the tone signal detection function of the modem 209 can then determine the presence/absence of a CNG signal. If the CPU 102 determines in step S805 that a CNG signal has been detected, the process advances to step S809 to start FAX communication using the second session which is in voice communication. The process further advances to step S810, and the CPU 102 stops the holding tone of the first session. In step S823, the CPU 102 restarts the voice communication with the previous voice communication destination of the first session. The CPU 102 stands by for the voice communication to end in step S811, and the process then ends.

These control operations will be described with reference to FIG. 12.

To switch the voice communication of the second session to FAX communication, the data of the second session is connected to the PCM I/F 202 and the modem 209. More specifically, the selector 205 connects the transmission signal (TX) of the modem 209 to the reception signal (RX) of the PCM I/F 202. Furthermore, since the selector 206 reconnects the reception signal (RX) of the PCM I/F 201 to the transmission signal (TX) of the SLIC 208 as will be described later, the FAX communication tone of the second session never leaks out to the voice communication of the first session. This connection allows FAX communication using the second session, which has been described in step S509 of FIG. 5.

On the other hand, the holding tone output from the modem 207 for the first session is stopped, and the PCM I/F 201 connected to the modem 207 is disconnected, thereby reconnecting the PCM I/F 201 and the SLIC 208. More specifically, the selector 204 connects the transmission signal (TX) of the SLIC 208 to the reception signal (RX) of the PCM I/F 201, and the selector 206 connects the transmission signal (TX) of the PCM I/F 201 to the reception signal (RX) of the SLIC 208.

The call waiting function can incorporate a function of switching to the previous caller by placing the interrupt caller on hold, when a short on-hook (hooking) operation is detected at this timing.

A description of details of the operation will be omitted. In this case, the holding tone output to the caller of the interrupt call is stopped, and the session data of the previous caller is connected to the SLIC 208. Furthermore, the session data of the caller of the interrupt call is connected to the modem 207 or 209, thereby outputting a holding tone from the modem 207 or 209. This can restart the voice communication of the first session.

If the CPU 102 determines in step S805 of FIG. 8 that no CNG signal has been detected, the process advances to step S806, and the CPU 102 determines whether the voice communication of the second session has ended. This is determined depending on whether the hook detection function of the SLIC 208 for the connected telephone 114 has detected an on-hook operation or the voice communication partner has been disconnected. If an on-hook operation has been detected, that is, the end of the voice communication has been detected in step S806, the process advances to step S807, and the CPU 102 disconnects the voice communication of the second session (sends an SIP signal BYE to the IP network). In step S821, the holding tone of the first session output from the modem 207 is stopped. The process advances to step S822, and the CPU 102 restarts the voice communication with the voice communication partner of the first session. The voice communication can be restarted by returning to the connection described with reference to FIG. 10. This allows the voice communication of the first session to restart. The CPU 102 stands by for the voice communication to end in step S808, and the process then ends.

As described above, when an incoming audio call is received while the first session is in voice communication, the pseudo call waiting function can switch the incoming audio call to voice communication or FAX reception.

The operation of processing (F) when an incoming audio call of the third session is received will be described with reference to FIG. 9.

Figure 9:
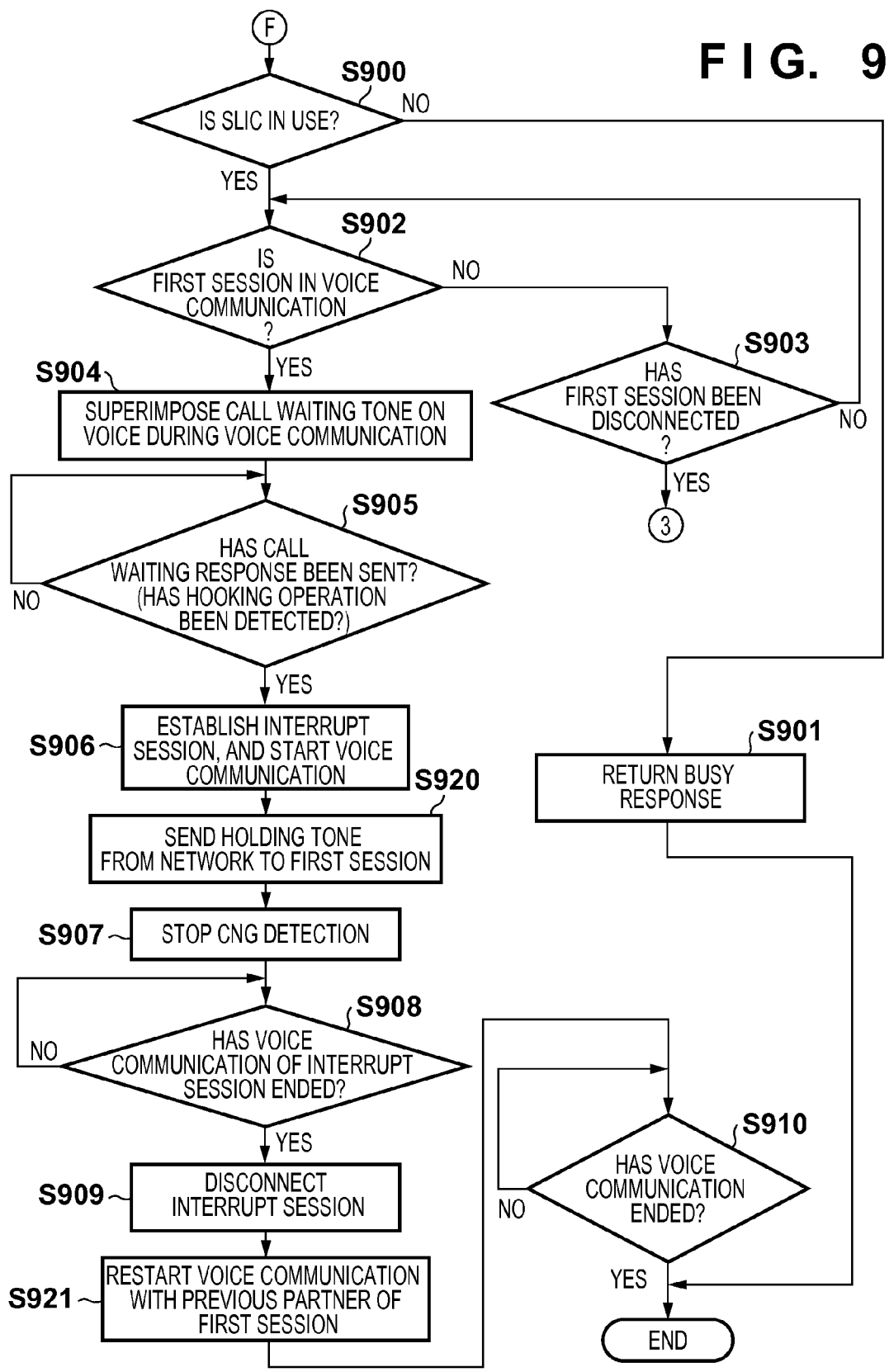
FIG. 9 is a flowchart for describing processing when the image communication apparatus receives an incoming audio call of the third session in step S700 of FIG. 7 according to the embodiment.

FIG. 9 is a flowchart for describing processing when the image communication apparatus 101 receives an incoming audio call of the third session in step S700 of FIG. 7 according to the first embodiment.

In this case, since the two sessions have already been fully used, the incoming call is assumed to be an incoming call with call waiting by the NGN line.

In step S900, the CPU 102 determines whether the SLIC 208 is in use. If the SLIC 208 is not in use, the two sessions are being used for FAX communication, and thus the process advances to step S901. In step S901, the CPU 102 returns a busy response (sends an SIP signal "486 busy here") to the NGN network, thereby rejecting the incoming call of the third session.

On the other hand, if the CPU 102 determines in step S900 that the SLIC 208 is in use, the first session is being used for voice communication and the second session is being used for FAX communication. The process thus advances to step S902, and the CPU 102 determines whether the first session has transited to a voice communication state. This can be determined depending on whether ringing of the telephone 114 by the SLIC 208 has ended and the SLIC 208 has detected a hooking operation of the telephone 114. If the CPU 102 determines that the first session is not in voice communication, that is, the telephone is in a ringing state, the process advances to step S903 and the CPU 102 determines whether the first session has been disconnected. If the CPU 102 determines that the first session has been disconnected, it indicates that the voice communication of the first session has ended, and thus the process advances to step S701 of FIG. 7. On the other hand, if it is determined in step S903 that the first session has not been disconnected, the process returns to step S902 to stand by for the first session to become in voice communication. If the CPU 102 detects in step S902 that the first session is in voice communication, a call waiting operation is performed in step S904 and subsequent steps. FIG. 13 shows the connection state of the voice signal processor 113 in this case.

Referring to FIG. 13, with respect to the data of the first session, the PCM I/F 201 and the SLIC 208 are connected to perform voice communication using the first session. Therefore, the selector 204 connects the transmission signal (TX) of the SLIC 208 to the reception signal (RX) of the PCM I/F 201, and the selector 206 connects the transmission signal (TX) of the PCM I/F 201 to the reception signal (RX) of the SLIC 208.

Furthermore, with respect to the data of the second session, the PCM I/F 202 and the modem 209 are connected to perform FAX communication using the second session. Therefore, the selector 205 connects the transmission signal (TX) of the modem 209 to the reception signal (RX) of the PCM I/F 202, and the selector 206 connects the transmission signal (TX) of the PCM I/F 201 to the reception signal (RX) of the SLIC 208.

As described above, when the two sessions have been fully used, an incoming call with call waiting is accepted from the NGN network (an INVITE signal as an SIP signal is accepted). With this processing, the voice signal superimposition function of the SLIC 208 during voice communication superimposes a notification (incoming call display tone: a beep) of the incoming call on a voice during voice communication. Furthermore, the hook detection function of the SLIC 208 for the connected telephone 114 detects a short on-hook operation (step S905 of FIG. 9: call waiting response detection). If a call waiting response is detected, the process advances to step S906, and the CPU 102 stops superimposition of the incoming call display tone, and establishes a session for the interrupt call. More specifically, the CPU 102 sends a 200 OK signal as an SIP signal to the NGN network. This causes the NGN network to set the voice communication of the first session in a holding state, and sends a holding tone to the voice communication partner of the first session in step S920, thereby setting the incoming call with call waiting in a voice communication state.

Furthermore, the CPU 102 prohibits detection of a CNG signal in step S907 of FIG. 9. This is done by, for example, turning off the CNG detection function of the modem 207 for the reception signal.

The purpose of prohibiting CNG detection is as follows. That is, if the incoming call with call waiting is caused to transit to FAX communication while the two sessions fully operate, the FAX communication does not end within a short time, and the first voice communication partner who is on hold needs to wait a long time. This results in an unnecessary line connection, thereby raising a connection fee. The purpose is to prevent this.

In step S908, the CPU 102 determines whether the voice communication of the interrupt session has ended. This is determined depending on whether the hook detection function of the SLIC 208 has detected an on-hook operation of the connected telephone 114 or the voice communication partner has been disconnected. If the end of the voice communication is detected, the process advances to step S909 to terminate the voice communication of the interrupt session. More specifically, the CPU 102 sends an SIP signal BYE to the NGN network using the session. Upon receiving the signal, the NGN network disconnects the voice communication of the interrupt session, and switches to the first voice communication partner in step S921.

The call waiting function includes a function of switching to the previous caller by placing the interrupt caller on hold, when a short on-hook (hooking) operation is detected at this timing. In this case, the NGN network side performs switching by outputting an SIP signal defied by the call waiting service of the NGN to the IP network. In this way, the voice communication with the first voice communication partner restarts.

As described above, even if an incoming audio call (an incoming call with call waiting) is received while the two sessions are fully used, it is possible to perform voice communication using the call waiting function.

In this embodiment, transition to FAX reception by an interrupt call is prohibited. Therefore, it is possible to prevent the first voice communication partner from being kept on hold for a long time, and prevent an unnecessary communication fee from being charged.

Note that a case in which the apparatus includes one SLIC and two modems has been described above. However, the number of SLICs and that of modems are not limited to them. That is, as the number of SLICs increases, the number of simultaneously executable voice communications also increases. As the number of modems increases, the number of simultaneously executable FAX communications also increases. Therefore, assume that it is possible to appropriately change the threshold of the number of sessions described with reference to the above flowcharts according to an increase/decrease in number of SLICs or modems.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-129027, filed Jun. 19, 2013, which is hereby incorporated by reference herein in its entirety.

What is claimed is:

1. A communication apparatus capable of performing voice communication via an IP network, and performing FAX communication using a deemed voice, comprising:
    a telephone control unit configured to connect a telephone and control the telephone;
    a FAX communication control unit configured to control FAX communication using a deemed voice;
    a selection unit configured to switch a signal from the IP network to the telephone control unit and the FAX communication control unit;
    a determination unit configured to determine, at the time of reception of an incoming call, whether an incoming voice communication call or digital data has been received; and
    a control unit configured to, in a case where the determination unit determines that the incoming voice communication call has been received and there is an already connected voice communication session, control the telephone control unit to superimpose a tone of a notification of the incoming call on a voice during voice communication and to establish a new session for the incoming call when the telephone instructs to switch to the incoming call, control the selection unit to connect the already connected voice communication session to the FAX communication control unit, and control the FAX communication control unit to send a holding tone.

2. The apparatus according to claim 1, wherein in a case where the number of already connected voice communication sessions is one or two when the apparatus is not in an automatic reception mode, and at least one of the sessions is voice communication with the telephone control unit, the control unit is configured to control the telephone control unit to superimpose a tone of a notification of the incoming call on a voice during voice communication and to establish a new session for the incoming call when the telephone instructs to switch to the incoming call, and to control the selection unit to connect the already connected voice communication session to the FAX communication control unit to send a holding tone.

3. The apparatus according to claim 2, wherein the instruction to switch to the incoming call by the telephone is a call waiting response.

4. The apparatus according to claim 2, wherein in a case where the number of already connected voice communication sessions is two when the apparatus is not in the automatic reception mode, the control unit is configured to prohibit a user from issuing a manual reception instruction.

5. The apparatus according to claim 2, wherein in a case where the number of already connected voice communication sessions is two when the apparatus is in a FAX/TEL switching mode, the control unit is configured to not determine whether the incoming call is FAX communication or telephone communication.

6. The apparatus according to claim 2, wherein in a case where the number of already connected voice communication sessions is one when the apparatus is not in the automatic reception mode, the control unit is configured to start FAX communication using a deemed voice by causing the selection unit to switch the incoming call to the FAX communication control unit upon receiving a manual reception instruction from a user, and to start the already connected voice communication session by stopping a holding tone to the already connected voice communication session.

7. The apparatus according to claim 2, wherein in a case where the number of already connected voice communication sessions is one when the apparatus is in a FAX/TEL switching mode, the control unit is configured to determine whether the incoming call is FAX communication or telephone communication by causing the selection unit to switch the incoming call to the FAX communication control unit upon receiving a manual reception instruction from a user, and, in a case where it is determined that the incoming call is FAX communication, to start FAX communication, and to start the already connected voice communication session by stopping a holding tone to the already connected voice communication session.

8. The apparatus according to claim 1, wherein the FAX communication control unit includes a plurality of digital modems.

9. A communication apparatus comprising:
    an IP packet generation/analysis unit configured to generate and analyze an IP packet;
    an interface unit configured to receive an incoming audio call from the IP packet generation/analysis unit;

a telephone control unit configured to control a telephone by connecting the telephone;

a first FAX communication control unit and a second FAX communication control unit which are configured to control FAX communication using a deemed voice;

a selection unit configured to switch a signal from the interface unit to the telephone control unit and the FAX communication control unit; and a control unit configured to:

(i) in a case where the interface unit receives an incoming audio call during voice communication of a first session using the telephone, control the telephone control unit to superimpose an incoming call display tone on the voice communication using the telephone and, in response to a hooking operation of the telephone, control the selection unit to connect the incoming audio call to the telephone control unit and connect the voice communication of the first session to the first FAX communication control unit to send a holding tone, and (ii) in a case where the incoming audio call includes a CNG signal, control the selection unit to connect the incoming audio call to the second FAX communication control unit to start FAX communication and connect the voice communication of the first session to the telephone control unit to restart the voice communication using the telephone.

10. A method of controlling an image communication apparatus which is capable of performing voice communication via an IP network and performing FAX communication using a deemed voice, and includes a telephone control unit configured to control a telephone by connecting the telephone, a FAX communication control unit configured to control FAX communication using a deemed voice, and a selection unit configured to switch a signal from the IP network to the telephone control unit and the FAX communication control unit, the method comprising:

determining, at the time of reception of an incoming call, whether an incoming voice communication call or digital data has been received;

in a case where it is determined that the incoming voice communication call has been received and there is an already connected voice communication session, causing the telephone control unit to superimpose a tone of a notification of the incoming call on a voice during voice communication; and when the telephone instructs to switch to the incoming call, establishing a new session for the incoming call, controlling the selection unit to connect the already connected voice communication session to the FAX communication control unit, and controlling the FAX communication unit to send a holding tone.

11. A non-transitory computer-readable storage medium storing a program for causing a computer to function as a communication apparatus configured to perform voice communication via an IP network, and performing FAX communication using a deemed voice, the communication apparatus comprising:

a telephone control unit configured to connect a telephone and control the telephone;

a FAX communication control unit configured to control FAX communication using a deemed voice;

a selection unit configured to switch a signal from the IP network to the telephone control unit and the FAX communication control unit;

a determination unit configured to determine, at the time of reception of an incoming call, whether an incoming voice communication call or digital data has been received; and a control unit configured to, in a case where the determination unit determines that the incoming voice communication call has been received and there is an already connected voice communication session, control the telephone control unit to superimpose a tone of a notification of the incoming call on a voice during voice communication and to establish a new session for the incoming call when the telephone instructs to switch to the incoming call, control the selection unit to connect the already connected voice communication session to the FAX communication control unit, and control the FAX communication control unit to send a holding tone.

* * * * *